(12) United States Patent
Roberts

(10) Patent No.: US 11,290,572 B2
(45) Date of Patent: Mar. 29, 2022

(54) SYSTEM AND METHOD FOR FACILITATING SHARING OF VIRTUAL THREE-DIMENSIONAL SPACE

(71) Applicant: Michael Roberts, Los Gatos, CA (US)

(72) Inventor: Michael Roberts, Los Gatos, CA (US)

(73) Assignee: Constructive Labs, Santa Cruz, CA (US)

(*) Notice: Subject to any disclaimer, the term of this patent is extended or adjusted under 35 U.S.C. 154(b) by 391 days.

(21) Appl. No.: 15/435,188

(22) Filed: Feb. 16, 2017

(65) Prior Publication Data

US 2018/0131788 A1  May 10, 2018

Related U.S. Application Data

(60) Provisional application No. 62/418,643, filed on Nov. 7, 2016.

(51) Int. Cl.
*H04L 29/06* (2006.01)
*H04L 29/08* (2006.01)
*G06F 3/0481* (2013.01)
*H04L 67/131* (2022.01)
*G06F 3/04815* (2022.01)
*H04L 67/1095* (2022.01)

(52) U.S. Cl.
CPC .......... *H04L 67/38* (2013.01); *G06F 3/04815* (2013.01); *H04L 67/1095* (2013.01)

(58) Field of Classification Search
CPC .. H04L 67/38; H04L 67/1095; G06F 3/04815

USPC ........................................... 715/798
See application file for complete search history.

(56) References Cited

U.S. PATENT DOCUMENTS

| 5,293,470 A * | 3/1994 | Birch | G06F 3/0481 |
| | | | 345/634 |
| 6,370,565 B1 * | 4/2002 | Van Gong | A63F 13/12 |
| | | | 709/205 |
| 2003/0037101 A1 * | 2/2003 | Torabi | G06F 3/011 |
| | | | 709/203 |

(Continued)

FOREIGN PATENT DOCUMENTS

| EP | 0753835 A2 * | 1/1997 | ............ G06T 19/00 |
| WO | 0753835 A2 | 1/1997 | |

(Continued)

*Primary Examiner* — Sherief Badawi
*Assistant Examiner* — Conrad R Pack
(74) *Attorney, Agent, or Firm* — Shun Yao; Yao Legal Services, Inc.

(57) ABSTRACT

One embodiment provides a system that facilitates shared virtual reality space. During operation, the system receives a first message associated with a first virtual reality object, wherein the first message includes a first address for the first virtual reality object and indicates a first action to be performed on the first virtual reality object. The system performs the first action on the first virtual reality object. The system determines a second address for a second virtual reality object that is remotely maintained and corresponds to the first virtual reality object. The system constructs a second message, which includes the second address and indicates the first action, thereby allowing the first action to be performed on the second virtual reality object.

15 Claims, 14 Drawing Sheets

(56) References Cited

U.S. PATENT DOCUMENTS

| | | | |
|---|---|---|---|
| 2003/0195735 A1* | 10/2003 | Rosedale | G06F 17/5009 |
| | | | 703/13 |
| 2005/0071428 A1* | 3/2005 | Khakoo | G06Q 10/107 |
| | | | 709/204 |
| 2005/0097561 A1* | 5/2005 | Schumacher | G06F 8/10 |
| | | | 718/106 |
| 2006/0294459 A1* | 12/2006 | Davis | G06F 40/166 |
| | | | 715/205 |
| 2007/0130363 A1* | 6/2007 | Barros | H04L 67/327 |
| | | | 709/238 |
| 2007/0248261 A1 | 10/2007 | Zhou et al. | |
| 2008/0005200 A1* | 1/2008 | Tysowski | G06F 16/27 |
| 2009/0157853 A1* | 6/2009 | Doi | G06F 16/51 |
| | | | 709/220 |
| 2009/0300059 A1* | 12/2009 | Castelli | A63F 13/12 |
| 2010/0106512 A1* | 4/2010 | Hyndman | G06Q 10/10 |
| | | | 705/1.1 |
| 2010/0146085 A1* | 6/2010 | Van Wie | H04L 12/00 |
| | | | 709/220 |
| 2011/0225596 A1* | 9/2011 | Sunderland | G05B 19/0428 |
| | | | 719/312 |
| 2014/0201735 A1* | 7/2014 | Kannan | G06F 9/45558 |
| | | | 718/1 |
| 2016/0156543 A1* | 6/2016 | Holland | H04L 45/04 |
| | | | 370/392 |
| 2017/0178260 A1* | 6/2017 | Wilde | G06F 3/011 |

FOREIGN PATENT DOCUMENTS

| | | | |
|---|---|---|---|
| WO | 0753836 A2 | 1/1997 | |
| WO | 2005015880 A1 | 2/2005 | |

* cited by examiner

SYSTEM AND METHOD FOR FACILITATING SHARING OF VIRTUAL THREE-DIMENSIONAL SPACE

RELATED APPLICATIONS

This application claims the benefit of:

U.S. Provisional Application No. 62/418,643, titled "System and Method for Facilitating Sharing of Virtual 3D Space," by inventor Michael Roberts, filed 7 Nov. 2016.

BACKGROUND

Field

This disclosure is generally related to distribution of digital content. More specifically, this disclosure is related to a system that transparently replicates objects in a shared viewable three-dimensional (3D) space from one computer to another, while concurrently simulating a large number of objects in an accurately maintained execution context.

Related Art

Graphical programming of computers continues to grow at a rapid pace. Historically, visual programming languages have allowed users to create programs by controlling program elements graphically instead of textually. Supporting large-scale visual programming may have motivated work on virtual reality, including a head-mounted display. However, although the visual programming construct may enable rapid generation of simple programs, it does not efficiently address the issues of organization and complex navigation necessary for the generation of a complex artifact. Component-based programming (e.g., Unix, Objective C, and Smalltalk) sought to address this inefficiency by dividing the software functionality of a large application into smaller communicating units via modularity and encapsulation. Process formalisms for programming early parallel computers, along with graph theoretic approaches, are common in concurrent programming. Eventually, node-based visual content development programs enabled users with limited programming experience to visually "wire" together components from a set of pre-built modules and to perform complex "rigging" for a variety of computer graphics animation tasks.

The development of interactive environments with end-user programming pre-dates the Internet, but such early environments were primarily textual in nature. For example, Multi-User Dungeon (MUD) and LambdaMoo rely on language for developing textual virtual realities. LambdaMoo further uses an object-oriented language in which users can extend the functionality of the world by programming scripted objects in a simple-to-use object-oriented programming language.

Commercial success for 3D multi-user game environments (e.g., Everquest and World of Warcraft) is driven by massive improvements to a PC's ability to process graphic 3D game content. Encompassing large developments budgets, these environments are typically based on a custom C or C++ coded "client" application, along with a custom coded multi-computer server back-end. At the same time, other multi-user games focus on "world building" and "player created content" (e.g., HighFidelity, SecondLife, Project Sansar, and Minecraft).

One area of graphical programming that continues to grow is the programming and viewing of interactive 3D spaces. However, one challenge that remains is, on the one hand, maintaining the illusion of a 3D viewable shared space in which changes made to an object on one computer are transparently replicated to other computers viewing the same space, while, on the other hand, maintaining concurrency in the execution environment so that a large number of objects can be simulated in concert on a modern multi-core processor. Another challenge is creating a programming model which is comprehensible to average users yet makes efficient use of modern computer hardware.

SUMMARY

One embodiment provides a system that facilitates shared virtual reality space. During operation, the system receives a first message associated with a first virtual reality object, wherein the first message includes a first address for the first virtual reality object and indicates a first action to be performed on the first virtual reality object. The system performs the first action on the first virtual reality object. The system determines a second address for a second virtual reality object that is remotely maintained and corresponds to the first virtual reality object. The system constructs a second message, which includes the second address and indicates the first action, thereby allowing the first action to be performed on the second virtual reality object.

In some embodiments, determining the second address is based on a list associated with the first virtual reality object. The system adds to the list a new address for a new virtual reality object. The system generates a representation of the first virtual reality object. The system constructs a third message, which includes the new address and the representation of the first virtual reality object, thereby allowing a replica of the first virtual object to be created remotely based on the new address.

In some embodiments, a respective virtual reality object is contained in a simulator, which is included in an engine, and an address for the respective virtual reality object includes an identifier for the corresponding engine that includes the respective virtual reality object.

In some embodiments, the system discovers one or more other virtual reality objects in a network, based on one or more of: an instance index which is based on an instance identifier for a respective virtual reality object; a hierarchical index which is based on a path name for a respective virtual reality object; and a spatial index which is based on a queried distance in three-dimensional space away from a specified virtual reality object.

In some embodiments, the first virtual reality object is one or more of: an actor; an entity; an object; an edge which is an object with a sender port and a receiver port; and a node with one or more ports, wherein the node can couple via edges to ports on other nodes, wherein the node is uniquely identified by a combination of an engine identifier and an instance identifier, and wherein a respective port can couple to one or more edges.

In some embodiments, the first action indicated in the first message includes one or more of: creating a child node of an identified parent node; removing the first virtual reality object; setting a property of the first virtual reality object; returning a property of the first virtual reality object; invoking a specified input or output port; connecting an output edge on an identified port to another node; connecting a set of output edges on a set of identified ports to another set of ports; setting a context by pointing an execution context to another node; and committing the first action.

In some embodiments, the first message includes a plurality of fragments, wherein a respective fragment corresponds to an effector object which performs the first action.

In some embodiments, the first virtual reality object is a replica of the second virtual reality object residing in a remote engine, and only one definitive copy of a replica exists for a respective virtual reality object. In response to determining that the first virtual reality object is not the definitive copy and that the first action does not comprise an additive action: the system determines the second address in advance of performing the first action, wherein the second address corresponds to the definitive copy; the system constructs the second message, thereby allowing the first action to be performed on the definitive copy, and allowing a third message to be constructed, wherein the third message includes the first address and indicates the first action; and in response to receiving the third message, the system performs the first action on the first virtual reality object. In response to determining that the first virtual reality object is the definitive copy, the system performs the first action on the first virtual reality object.

BRIEF DESCRIPTION OF THE FIGURES

In the figures, like reference numerals refer to the same figure elements.

DETAILED DESCRIPTION

Figure 1A:
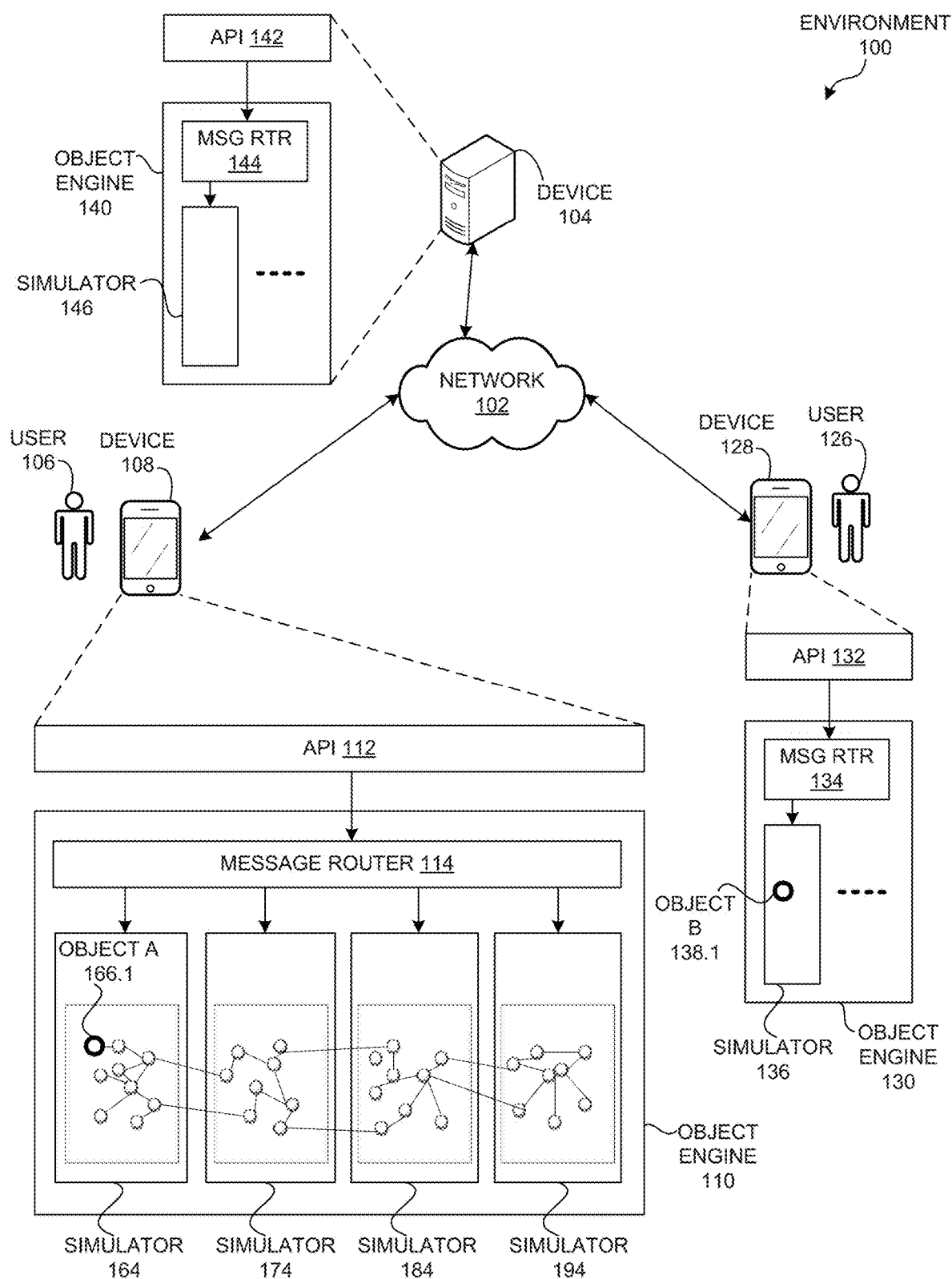
FIG. 1A illustrates an exemplary environment which facilitates shared virtual reality space, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which solves the problem of both maintaining the illusion of a viewable shared 3D space by transparently replicating changed objects in one space to another viewable space, and maintaining concurrency in the execution environment to handle simulating a large number of objects at the same time on a modern multi-core processor. The challenges in multi-user 3D network programming rely on conventional network programming, which can be computationally costly when taking into account, inter alia, network communication, response time, back-end and server-side computations, latency, and scalability.

Embodiments of the present invention address these challenges by providing a system which allows a user to develop an application or object, and simply deploy the application or object to the cloud for use in a larger application. The system is based on turning the input and output of an object into a message system, where the message may be transported either within a machine or across a network. Thus, the network functionality of an object is built into the object itself, which allows a programmer of the object to write only the object itself, without having to explicitly write or handle the network programming aspect of the object.

Thus, the present system provides improvements to the distribution of digital content, where the improvements are fundamentally technological. Embodiments of the present invention provide a technological solution (e.g., using a messaging system within an object to handle transparent replication of the object in a network) to the technological problem of the efficient and effective distribution of digital content, specifically as related to data in a viewable and shared 3D space.

The following terms are used in this disclosure:

The term "entity" refers to an object in the system with an address comprised of an identifier for an engine comprising the entity ("engine identifier" or "engineID") and an identifier for an instance of the entity ("instance identifier" or "instanceID"). Any object in the system can be uniquely identified by a combination of its engine identifier and its instance identifier. An entity can be a plain object, a virtual reality object, a node, or an edge.

The term "engine" or "object engine" refers to a composite entity with a unique identifier (i.e., an engine identifier). An engine or object engine can include one or more simulators or simulator entities, as well as an instance index, a hierarchical index, and a spatial index.

The term "simulator" refers to an entity which performs simulation on a number of objects by processing messages routed to a message queue associated with the simulator. A simulator can remove messages from its message queue and can also block when its message queue is empty, thus consuming minimal system resources when not processing messages.

The term "effector" or "effector object" refers to an object which can perform an "action" upon an entity. Exemplary actions can include changing the state of an entity, and are described below.

The term "instance index" refers to an index which locates other objects based on the instance identifier for a specified object.

The term "spatial index" refers to an index which allows a specified object to locate other objects which are close to the specified object, e.g., based on a queried distance in three-dimensional space away from a specified object.

The term "hierarchical index" refers to an index which allows a specified object to locate other objects in a hierarchy of objects, e.g., based on path names for the other objects or a hierarchy organized in a manner similar to a conventional file system.

The term "node" is an entity or object which has a number of ports and can couple via edges to ports on other nodes. A node is uniquely identified by a combination of an engine identifier and an instance identifier.

The term "edge" is an entity or object which has a sender port and a receiver port.

The term "port" refers to an entity or object which can couple to one or more edges. Conceptually, ports are "owned" by nodes.

Overview of Model

Embodiments of the present invention provide a system based on the Actor model in concurrent computing, in which an individual actor (i.e., an object, entity, node, or edge) can respond to messages sent to it by changing its state, or by sending messages to other actors. Individual actors may be simulated by different threads. The actors of the present invention include nodes and edges, which can be connected together to form a graph. These nodes and edges are in contrast to conventional actors, which have no such edge-defined, inter-object connection (although they can communicate with each other). Any actor of the present invention can engage in the message sending process, and can also inherit from a common set of super-classes.

It may be inefficient to have one thread per actor on many modern processors while also allowing for a detailed object-level granularity. As a result, nodes can be grouped together into a "simulator" which processes messages for multiple nodes, one after another, using a message queue and a message processing loop. This scheme is a variant of a scheme commonly known as "thread confinement," which ensures that data is only accessible from one thread. Many nodes may be grouped together in the same thread, but an actor (i.e., a node) may not be accessed by separate threads, either sequentially or simultaneously. In normal operation, only one thread ever interacts with an actor. In some circumstances, an actor may be transferred between threads. Over time, messages are added to a message queue for a simulator, and, after being processed, subsequently removed by the simulator.

An object engine can include a group of simulators, running inside a single process, along with supporting code such as asset loaders and rendering engines. Each simulator in an object engine operates upon its own distinct set of "grouped together nodes" or "thread-confined nodes." Thus, an author of an individual node can write code for the node in a straight-forward manner. The node author can implement the node as a single object-oriented object, running in a single thread. The node author can also write unsynchronized non-concurrent code which responds to an input (i.e., an event or a message), affects the internal state of the object, or generates an output (i.e., an event or a message). The system thus allows for the development of component actors by a programmer who is not necessarily experienced with concurrent programming, the mechanics of message distribution and network programming being hidden from the users.

Exemplary Network and Communication

FIG. 1A illustrates an exemplary environment 100 which facilitates shared virtual reality space, in accordance with an embodiment of the present invention. Computing environment 100 can include a computer network 102. Environment 100 can also include: computing devices 104, 108, and 128; a user 106 associated with device 108; and a user 126 associated with device 128. Device 104 can be a server, a content-hosting device, or any other computing device. Devices 108 and 128 can be a mobile computing device, a smartphone, a laptop, a tablet, a computer, a virtual reality viewing device, or any other computing device.

Device 108 can include an object engine 110, which is accessed via an API 112. Object engine 110 can also include a message router 114, which routes messages to simulators 164, 174, 184, and 194. Object engine 110 can include more or less simulators than depicted in environment 100. Each simulator can include a distinct set of grouped-together or thread-confined nodes, as depicted below in relation to FIG. 1B. Similarly, device 104 can include an object engine 140, which is accessed via an API 142. Object engine 140 can also include a message router 144, which routes messages to at least a simulator 146. Also, device 128 can include an object engine 130, which is accessed via an API 132. Object engine 130 can also include a message router 134, which routes messages to at least a simulator 136.

A user can perform an action on an associated device, which sends a message indicating a specific action to be performed on an object. The same message can also be sent to any replicas that are on a "view list" which includes addresses for any listening or currently subscribed entities. This messaging system results in the replicas and the original object having the same state. For example, a user viewing a shared virtual reality space can click a button on a local device to move an object to the right, which allows the user to view (on its local device) the object in the new position. At the object engine level, a message is generated, sent, and processed by the appropriate simulator comprising the affected object on the local device. At the same time, that same message is sent to any subscribed entity and routed to the corresponding object engine comprising the subscribed entity. Thus, a user of such a subscribed entity who is viewing the same virtual reality space will also be able to view the object moving to the new position. This messaging system in conjunction with the view list facilitates shared virtual reality space between two devices.

As an example, assume that simulator 136 includes an object B 138.1 ("object B") which is a replica of an object A 166.1 ("object A") in simulator 164, and that object B is on a view list for object A (i.e., that object B is listening to messages received by object A). User 106 can perform an action such as clicking on a mouse on device 108. The action can correspond to an action to change a color of object B, which is represented as an object accessible by simulator 164. Device 108 can send a message which includes an address for object A, via API 112. The message is received by message router 114, which sends the message to local simulator 164, which in turn performs the action on object A. At the same time, because object B is on the view list for object A, the message can also be sent to device 128 based on the address for object B. Device 128 can send the message (which includes the address for object B) via API 132. The message is received by message router 134 of object engine 130, which sends the message to simulator 136, which in turn performs the action on object B. This results in a new state of object B which is the same as the new state of object A. Performing an action within an object engine is described below in relation to FIG. 1B.

Note that environment 100 is depicted with three devices. In some embodiments, devices 108 and 128 communicate directly with each other, acting as client devices in a distributed system. In other embodiments, device 104 can act as a centralized server for devices 108 and 128, allowing for a client-server based network of communication. Any device can act as a client or a server. Exemplary client-server communications are described below in relation to FIGS. 4A, 4B, and 4C.

Figure 1B:
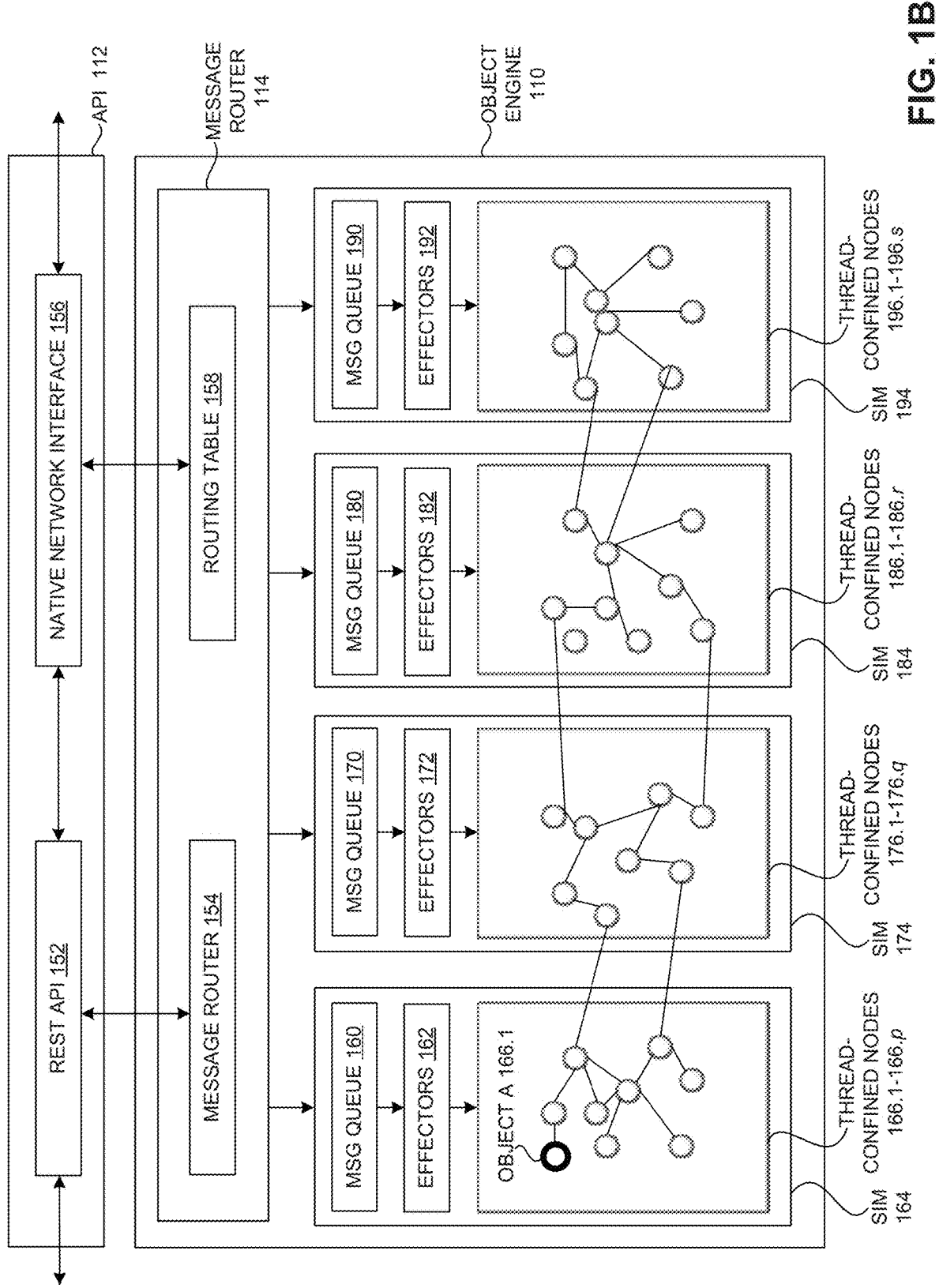
FIG. 1B illustrates an object engine corresponding to the exemplary environment of FIG. 1A, in accordance with an embodiment of the present invention.

FIG. 1B illustrates an object engine 110 corresponding to exemplary environment 100 of FIG. 1A, in accordance with an embodiment of the present invention. A message can be received by API 112, which can include a Representational State Transfer (REST) API 152 and a native network interface 156 (e.g., TCP/UDP). The message can be sent to message router 114, which can include a message router 154 that receives messages from REST API 152, and can also include a routing table 158 that receives messages from native network interface 156. Message router 114 can send the message to one of simulators 164, 174, 184, or 194. Simulator 164 can include a message queue 160, effectors 162, and thread-confined nodes 166.1-166.$p$; simulator 174 can include a message queue 170, effectors 172, and thread-confined nodes 176.1-176.$q$; simulator 184 can include a message queue 180, effectors 182, and thread-confined nodes 186.1-186.$r$; and simulator 194 can include a message queue 190, effectors 192, and thread-confined nodes 196.1-196.$s$.

Following the example described above in relation to FIG. 1A, assume that a "first message" arrives via API 112. Note that a message includes an address, comprised of an engine identifier and an instance identifier, a described further below. The engine identifier allows a message to be routed to the correct object engine (i.e., object engine 110), while the instance identifier allows a message to be further routed to the simulator comprising the identified object (i.e., simulator 164 with object A). Thus, the first message can include an address with an engine identifier for object engine 110 and an instance identifier for object A of simulator 164. A message also indicates an action to be performed on a target object. The action can include one of nine fundamental operations, as described further below.

Message router 114 receives the first message, identifies simulator 164 as the destination simulator comprising object A (based on the instance identifier), and sends the first message to message queue 160. Message queue 160 determines the appropriate time to send the first message to effectors 162. Effectors 162 can include a set of objects which perform one of the nine fundamental operations on an object. Effectors 162 can subsequently perform the action indicated in the first message on object A, resulting in a "new state" for object A. Furthermore, object engine 110 can determine a view list associated with object A, where the view list includes addresses for other entities which "sub-scribe" to object A (i.e., which have requested to view state changes to be made to object A). Object engine 110 can cause the first message to be sent to those addresses on the view list for object A. The sent message is essentially a second message which includes the address for a subscribed entity on the view list, and also includes the action indicated in the first message.

For example, the view list for object A can include an address for object B in simulator 136 of object engine 130. The second message can be routed to simulator 136 via API 132, message router 134, and a message queue (not shown in FIG. 1A) for simulator 136. An effector object (also not shown in FIG. 1A) in simulator 136 can then perform the indicated action on object B, which results in a "new state" for object B which is the same as the new state for object A. Rendering engines can affect a virtual display on the corresponding devices, thus facilitating shared virtual reality space, in this case, between devices 108 and 128, and specifically, between user 106 associated with device 108 and user 126 associated with device 128.

Exemplary Class Hierarchy

A partial class hierarchy of actors or objects in the system is provided herein:
BaseObject
PropertiedObject
IdentifiedObject
  BaseEdge
  BaseNode
  BaseNodeCore A PropertiedObject is a simple object with properties which a caller can "get" or "set." An IdentifiedObject is an object with an instance identifier, to which message can be sent, and which can be indexed. A BaseEdge is a root class of all edges, which connect between ports on nodes. A BaseNode is an object with ports. A BaseNodeCore is a node with a Core. For purposes of this disclosure, a Core can be described as a "Plain Old Java Object" (POJO) which is wrapped by the node to allow the node to participate as an agent. Equally, some implementations may choose to express the implementation details of nodes in other languages, e.g., JavaScript, Lua, or C++.

Identifying and Manipulating an Object Based on an Address

Because objects are confined to execution in separate distinct threads, a need exists to safely instruct the objects to perform operations from conventional computer code, such as the code running in the runtime environment surrounding the nodes, or via the REST API which the environment exposes for the connection of external tools. Requiring node developers to implement synchronization at the node level may introduce an unwanted burden, and is contrary to the purpose of and the efficiencies introduced by the system (i.e., allowing a node author to write unsynchronized non-concurrent code to implement the node as a single object-oriented object).

Embodiments of the present invention solve this problem by using "references." A reference is a type-safe "handle" to an object, and can be used to affect the behavior of a node in a thread-safe manner (i.e., by calling methods on the references). A reference may persist for as long as needed or as determined by a node author. The methods on the reference manipulate the state of the node by sending messages to the node, where the messages are executed in the corresponding simulators, as described above in relation to FIGS. 1A and 1B.

Each node inside a given object engine has a unique identifier (the "instanceID"). The instanceID is a universally unique identifier (UUID) (or a globally unique identifier (GUID)) composed of two long variables, each being 64-bits, for a total of 128-bits. The object engine containing the node is also identified by a similar 128-bit identifier (the "engineID"). Each simulator contains a queue of messages addressed to nodes identified by the instanceIDs.

In the instanceID, one of the 64-bit variables is the user identifier ("userID") of the user who created the object, while the other is a unique (to the user) identifier for the object. Similarly, for an engineID, one of the 64-bit variables making up the ID is the userID who created the engine, and the other is an incrementing variable. The userIDs can be obtained from a central system which handles user registration, while the individual object identifiers can be obtained from blocks of IDs allocated by the same central server system, or generated in a distributed fashion using an algorithm like "Snowflake."

No two objects in the system share the same combination of UUIDs. The combination of a node's instanceID and the engineID forms a unique address which can identify a node in the totality of running object engines across the entire internet. It is assumed that there are potentially many such object engines running at the same time.

Note that different object engines can contain different copies, or replicas, of the same nodes. All of these copies share the same instanceID, but the engineID for the node replicas are different, as the replicas reside in a different engine. The same engine will not have two or more nodes sharing the same instanceID. The instanceID is unique within an engine, and allows the engine to "find" the node. It is an address for the node, similar to how a memory address points to data in a conventional programming language.

Using the pair of identifiers, references know how to "find" a running node in the system. Node references expose a set of fundamental operations as methods on the reference, which correspond to the operations a message can perform on a node. The existence of the engineID means that a sending node may send a message to a replica of itself on another engine, or to a completely different node, as long as the sending node knows the instanceID of the replica or target object.

Calling a corresponding method on a reference results in the generation of a message. The message can be subsequently dispatched to the node and executed by the simulator which comprises the node. The caller of the methods on the reference may batch such calls for efficiency, in the same way that SQL methods can be batched together for atomic changes to a database, or draw calls batched in a modern graphics API (e.g., modern OpenGL and Vulkan). Note that a node reference in one object engine can reference an object in another object engine, if it has the engineID of the other engine.

A mechanism exists to replicate messages between object engines, and this mechanism can synchronize the state of nodes between the engines, as described below in relation to FIGS. 5A-5D and the section entitled "Serialization and Distributed Snapshots."

Discovering Other Nodes Based on Indexes

In order for a node to discover other nodes to connect to, or to dispatch messages to, the system provides three types of indexes for discovery (via a queryable interface): an instance index; a hierarchical index; and a spatial index.

The instance index is a simple index which locates nodes inside a single engine using the instanceID, as discussed above. For a given object engine, there is one instance index and one hierarchical index, but there may be a plurality of spatial indexes.

The spatial index is an index which can be attached to a "Zone" node, which is a content holder containing a large amount of content. The spatial index allows the quick discovery of objects spatially near to a given object (e.g., close in 3D space to a user). The spatial index may be used to send partial contents of a Zone to a connected machine, which may be required when a Zone includes large amounts of content.

The hierarchical index is an index which allows objects to find other object in a hierarchy of objects, such as based on path names or based on an organization similar to a conventional file system. For example, one common Zone mounted by the system by default is "/World/Zones/testZone." Objects using the index can, e.g., discover child nodes of that Zone, and navigate to the parent (/World/Zones).

In general, the arrangement of nodes in the spatial index corresponds directly to the "spanning hierarchy," which is a parent-child relationship expressed by references between nodes. In the spanning hierarchy, nodes (e.g., "Composite Nodes") can "contain" other nodes, and have parent nodes (e.g., "Parent Nodes," which are separate from the root node). Because nodes can be in different threads, traversing the spanning hierarchy in a thread-safe manner violates the simulator thread-confinement properties. Therefore, the hierarchical index can perform this function.

In a graphics application, the spanning hierarchy roughly corresponds to a conventional scene graph, with objects expressing transform variables, matrices, materials, and other graphics resources, such as textures, shader code, etc. For other applications, such as Internet-of-Things (IoT), the hierarchy may contain other objects, such as sensor interface objects, data processors, etc.

All indices return thread-safe reference objects which work as previously described. The spatial index returns a spatialization of a reference, which contains the absolute world coordinates of the referenced object, in addition to the contents of the simpler reference.

Figure 2:
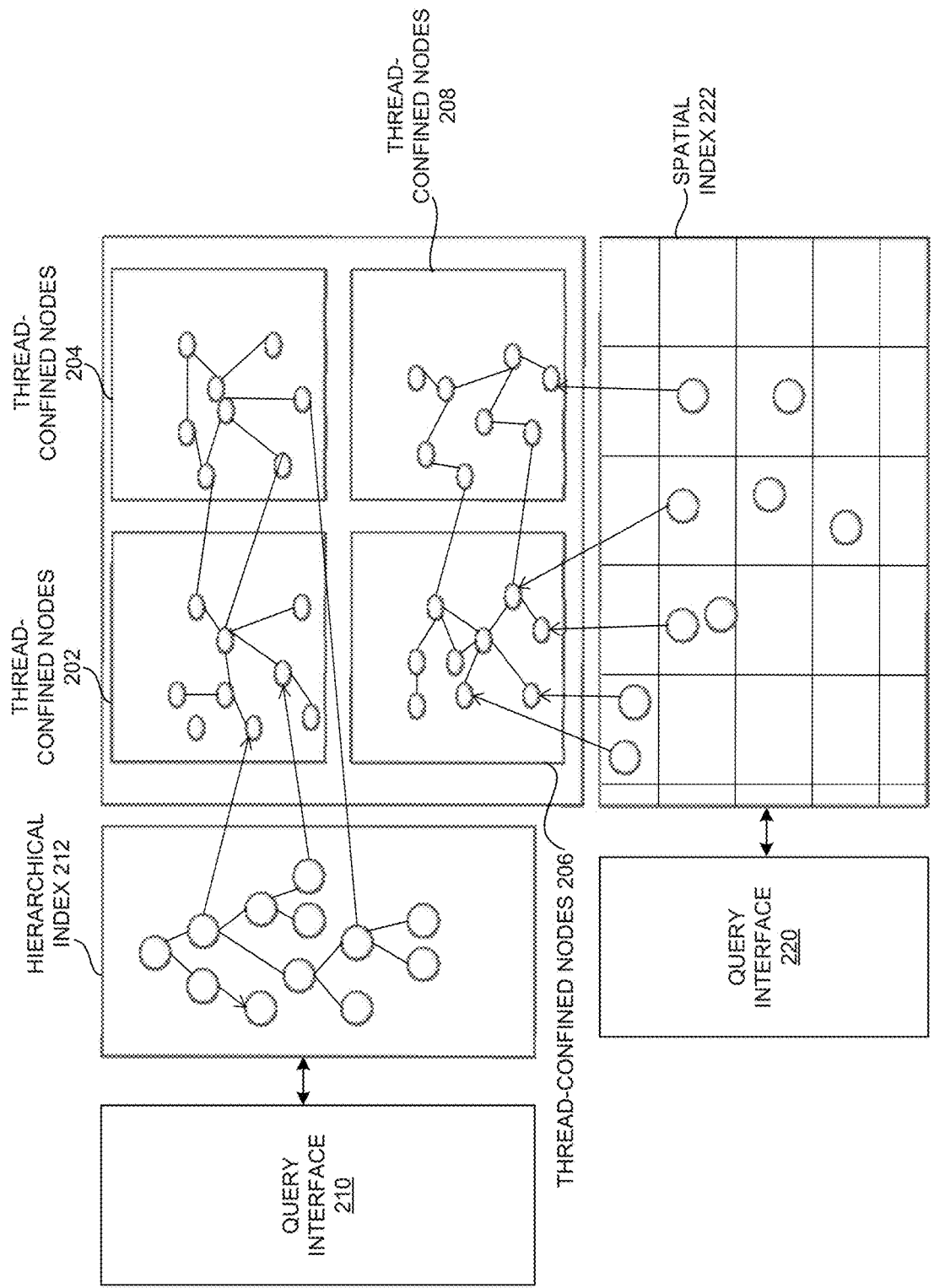
FIG. 2 illustrates an exemplary hierarchical index and an exemplary spatial index, in accordance with an embodiment of the present invention.

FIG. 2 illustrates an exemplary hierarchical index 212 and an exemplary spatial index 222, in accordance with an embodiment of the present invention. A query interface 210 can be used to locate objects in a hierarchy of objects, including thread-confined nodes 202, 204, 206, and 208. Note that thread confined nodes 202-208 are depicted as grouped together, respectively, in four separate simulators. A query sent via query interface 210 to an object engine (or any other container) which comprises thread-confined nodes 202-208 can return hierarchical index 212. Similarly, query interface 220 can be used to locate objects which are close in three-dimensional space to a given object. Thus, a query sent via query interface 220 to an object engine (or any other container) which comprises thread-confined nodes 202-208 can return spatial index 222 (e.g., based on a queried distance in 3D space away from a given object).

Fundamental Operations that Messages/References Can Perform on Nodes

A message or reference can perform one of the following nine fundamental operations (also referred to as "message fragments") on a node:

1) Create: Create a child node, a "child" of an identified parent object.
2) Remove: Delete an affected node or edge.
3) Set: Set a property of a specified node.
4) Get: Return a property of a specified node.

5) Invoke: Invoke a specified input or output port.
6) OutputEdge: Connect an output edge on an identified port to another node.
7) OutputEdgeSet: Connect a set of output edges on a set of identified ports to another set of ports. This can replace the current set of output edges on the target, and can further remove any output edges not in the set.
8) SetContext: Set the context of the current operation by pointing an execution context to another node. This sets the execution context to any of the original target and any newly created objects made by the message. This cannot be used to arbitrarily set the context to a node outside the set of created objects, for security reasons.
9) Commit: Commit the current transaction. This moves any newly created objects and any temporary state into the spanning hierarchy in one set. All message, whether they contain a Commit or not, are explicitly committed at the end of the message.

These nine operations can be expressed by a runtime system either as serialized objects or as byte codes with associated data, to be executed by a simple bytecode interpreter. These nine operations comprise a smaller instruction set than that expressed by a conventional byte-code interpreter. Rather than encoding "large" operations in the bytecode set, these operations are instead implemented as methods on the nodes. This allows the behavior of the system to be varied by changing the behavior of the methods (i.e., ports) exposed on the node/edges and the implementation of the objects themselves. This mechanism can be used to implement the different types of nodes/edges in the system.

A typical message to be executed by a node can contain a number of such message fragments, along with addressing information which controls the routing of the message and additional fields. An exemplary message is described below in relation to FIGS. 3A and 3B.

Exemplary Message

Figure 3:
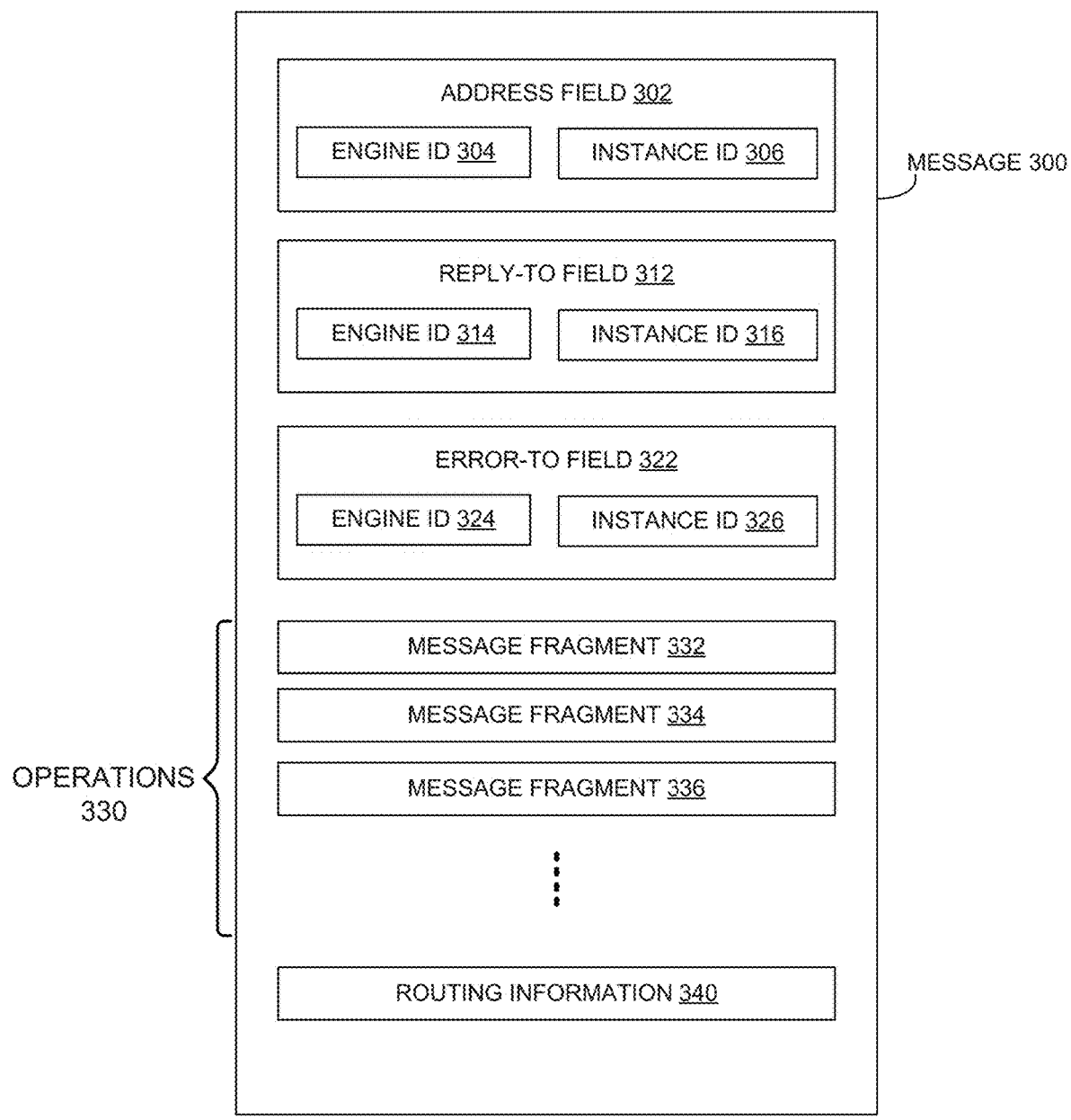
FIG. 3 illustrates an exemplary message which facilitates shared virtual reality space, in accordance with an embodiment of the present invention.

FIG. 3 illustrates an exemplary message 300 which facilitates shared virtual reality space, in accordance with an embodiment of the present invention. Message 300 can include an address field 302 comprised of an engine identifier 304 and an instance identifier 306. As described above, engine identifier 304 and instance identifier 306 can each be a 128-bit long UUID. Engine identifier 304 can determine the appropriate object engine (local or remote), while instance identifier 306 can determine the node in the appropriate simulator of the determined object engine. For example, engine identifier 304 can indicate both the user identifier of the engine creator and an incrementing variable, while instance identifier 306 can include both the user identifier of the object creator and the object identifier.

Message 300 can also include a reply-to field 312 comprised of an engine identifier 314 and an instance identifier 316. Reply-to field 312 determines what, if anything, is to be done with the state returned from a Get or an Invoke operation. Reply-to field 312 can also include a replyToSelector field (not shown). Engine identifier 314, instance identifier 316, and the replyToSelector field uniquely define a port on an object which accepts the reply message, among the world of objects mounted on different object machines across a network. The object engine creates a reply message in the execution context for the identified port/object, and is passed to the router for delivery. Subsequently, the identified object receives the reply message, whether on the local or a remote engine. Thus the system provides an equivalent of basic asynchronous Remote Method Invocation (RMI) functionality across nodes in the network.

As described below, edges are first-class objects and can thus receive messages in a manner similar to how nodes receive messages. This mechanism may be used in a systems parameter satisfaction algorithm, in which a sender calls a port on a receiver which requires more parameters than are supplied by the sender. In such a case, the system can evaluate edges connected from a parameter node contained in the edge. The node accumulates the results before the edge generates a follow-up message to actually invoke the receiver port.

Message 300 can also include an error-to field 322 comprised of an engine identifier 324 and an instance identifier 326. Error-to field 322 can handle errors in a manner similar to that described above for reply-to field 312.

Message 300 can also include one or more message fragments, such as message fragments 310, 312, and 314 (which together indicate operations 330 to be performed on the node identified by address field 302). A message fragment can indicate an action to be performed on the node identified by the address field. For example, message fragment 332 can indicate an action "Invoke (Input Port 21)," which invokes the specified input port 21. Message fragment 334 can indicate an action "Set (Color=Green)," which sets the color property of the node to green. Message fragment 336 can indicate an action "Get (Position)," which returns the position of the node. Message 300 can also include routing information 340, which may be used as described below.

A message "envelope" can refer to the fields necessary to determine a target destination, a return source, and any other information related to communication of the message itself. For example, the message envelope can include address field 302, reply-field 312, and error-to field 322. A message can also include additional fields (not shown).

Execution Context

As described above, the address field controls where a message is sent. A simulator executing the message can use an interpreter with an appropriate set of "effectors" to interpret the data in contained in the message. A set of effector objects can examine the fields of the message fragments in the message, and call the appropriate methods either on the target object or on a class object which can create new objects (e.g., the "node class"). A bytecode interpreter can provide equivalent functionality.

When the simulator begins execution of the message, the execution context, which controls the objects affected by the interpreter, is set to the target object. If the execution of a fragment creates a sub-object (via a Create fragment) the context is set to the newly created node. The setContext fragment may be used to set the context to the parent or a newly created sibling node. A set of push/pop operations (as are commonly used in interpreters for a similar purpose) may be used to create a similar effect.

Operations such as Get and Invoke map down to method/function calls on conventional code conceptually "contained" by the node. Note that multiple nodes can share the same code, but use different data. The system can support languages including Java, C++, and Lua. When executing a fragment, the system performs the invocation and collects a reply object. The reply object can be returned to the caller object, via a follow-up message.

Returning to FIG. 1B, recall that incoming messages are received by message router 114, and sent to the appropriate simulator (e.g., simulator 164). Message queue 160 handles and processes an incoming message, based on a message processing loop which involves: reading a message; binding the message; reading the message fragment; sending the message to effectors 162; and unbinding the message. Effectors 162 in turn analyze the message and perform the action indicated in the message fragment on the identified thread-confined node (one of nodes 166.1-166.*p*, such as object A 166.1). The performed action affects the state of the identified node, and thus the state of the thread-confined graph associated with thread-confined nodes 166.1-166.*p*.

Reflection is a common technique in higher-order programming. A reflected system exposes a set of objects corresponding to the objects which implement the system being reflected. Rather than being hidden inside the implementation, this technique allows the system to manipulate itself in a potentially recursive manner. The system exposes methods on objects that allow higher level code to introspect about the workings of the system, including: querying the input/output ports on objects; setting and getting object properties using identifiers; and creating objects using "NodeClass" objects (which are themselves first class nodes in the system).

Edges

Because actors need to affect the state of other actors, embodiments of the present invention use connectible ports, which allow nodes to be connected to other nodes into a graph. The system uses dynamic messaging to send data between nodes, as shown in relation to FIGS. 1A and 1B. Messages are akin to "calling" ports. There are two types of ports: input ports; and output ports. In general, edge-based connections are made from output ports to input ports. However, it may be useful to "trap" messages invoking input ports.

While many visual programming systems support ports, the connections between the ports are made statically and do not change during execution of the program. Embodiments of the present invention allow for "monkey patching," in which edges can be connected and disconnected at will by a running program.

At their most fundamental level, edges define a connection from a port on one node (e.g., "the sender") to a port on a different node (e.g., "the receiver"). Thus, the edges define part, but not the entirety, of the message flow in the system.

When code that is conceptually "inside" a node "executes an output," the system generates a message for each of the output edges emerging from the port. Each port defines a "signature" which indicates the arguments that the port expects to be present in order to execute the output. Calling a method such as output("clicked," 1, true) can generate a set of messages conceptually emerging from the output port, where each message contains the arguments (1, true), which are directed to the receiver ports connected from the output "clicked" on the node.

The set of generated messages can subsequently be routed to the receiver nodes, which execute the message (potentially in different threads) at a later time. The output call can return immediately, as in asynchronous methods calls in languages like JavaScript. However, the results from the message evaluation may be routed to another port using the replyTo fields of the message. In some embodiments, the messages may be routed out of process, to another running instance.

Edges can also have additional meanings and behaviors, as described below. Recall that edges are in fact a sub-class of actors themselves, in that they can receive and respond to messages. Edges can also have ports. For example, if an edge is connected from a port which supplies no parameters to a port which requires parameters, the edge can create ports for parameter satisfaction. These edges can be connected to other objects, which return values to complete the invocation.

The View Model

The simple actor model described in relation to FIGS. 1A and 1B may not address the issue of making decisions in which the stated problem is responding to the aggregate state of multiple objects. For example, consider a typical game logic situation. A player on a quest must kill or damage four dragons, at which point a "boss" dragon is created to emerge from a cave. In the simple model described above, each of the four dragons is a separate independent actor, and cannot see the state of the other dragons. Many methods for distributed consensus exist, but implementation of such operations can be complex and slow. In this example, an ideal situation may be to have one object which is aware of the state of the four dragons, where that one object performs a logical operation which decides when to release the "boss" dragon, and where that one object is programmed in the same style as the other objects. A simple release logic state machine (or something more complex) may address this situation.

Embodiments of the present invention provide two mechanisms for dealing with such a situation. The first mechanism is wiring from ports, as described above. The edge is triggered when the input or output that it is connected to on the sender object is executed, and the message is replicated to the view (the receiver). Thus, the partial state of the object may be received, selectively, based on the entities to which the edges are wired. The state of non-wired ports (e.g., the port other than the ports that are wired to) is not received. Execution of the edge can result in the execution of a method connected to a corresponding "input" port on the receiver object to which the edge is wired.

The second mechanism is based on views. A "view" object receives all the messages sent to the corresponding specified object. The view object can contain a set of "subscribed" or "viewing" objects, which are observing the specified object. In addition to making aggregate decisions based on the state of multiple objects, the view mechanism can also be used to control the replication of messages between computers. The view object can therefore perform logic which observes the state of the subscribed or viewing objects, and either modify its own internal state (which is separate from the state of the subscribed or viewing objects), or generate output messages, which can be sent to another object. For example, a message arriving at a view object is sent to a set of "viewing" objects, which are observing the state of the specified object. When a view is added (i.e., when another object wishes to be added to the view object, or subscribes to the view object for the specified object), the entire state of the specified object can be sent to the newly subscribed viewing object. As subsequent messages arrive, the view object can receive the messages and change the state in order. Furthermore, as subsequent message arrive, the view object can selectively update the state of its view of the world and, in turn, send out messages. This implementation is similar to the Model-View-Controller paradigm, discussed in Reenskaug, T. M. H, "MVC Xerox PARC 1978-79," https://heim.ifi.uio.no/~trygver/themes/mvc/mvc-index.html (last visited Jan. 18, 2017), but is fully distributed and actor-based.

The view object can also be maintained as a list or other entity which can indicate and maintain a group of subscribed of viewing objects based on their unique addresses.

Views and Message Routing

Thus, as described above, a view can essentially siphon off all of the messages which are sent to a given object, whether via wiring or by message sending. In order to synchronize the state between different processes on different machines, embodiments of the present invention use both views and spatial data structures. Consider that an end user is looking at a landscape in a virtual reality space. The end user can see birds flying in the distance and a small tree moving in the wind. These objects are all in the end user's view. As the end user moves around, other objects that the end user cannot currently see enter his field of view, while some objects leave his field of view. The spatial data structure on the Zone can perform this function. Based on the end user's position in the virtual reality world, the system re-computes the set of viewable objects occasionally, and maintains a single "remote viewer" object in the views of all of the in-range objects. This remote viewer object is the end user's own personal view, and can exist on the server which serves content for the end user's virtual reality world. The end user's client device (e.g., virtual reality viewing goggles or 3D viewing glasses associated with a computing device of the end user) is the end point for the messages collected by the remote viewer object.

The system can serialize the message by "squashing" the messages, transmit them across TCP, and de-serialize them at the other end. The messages that emerge on the client device are injected into and executed by the appropriate local simulators. This serialization process is described below.

Note that it would be impractical to send every message executing in the system all of the time to everywhere that it may be needed. To ensure that the system only replicates important messages, the system defines a specific "root cause" message. A root cause message is a message which gives rise to other messages, and which itself is not caused by a message. For example, when a user interacts directly with an object by sending it a message (e.g., by clicking on a ball object with a controller), the sent message is a root cause message because it is not generated as a result of executing any other message. Root cause messages are important because they give rise to a host of other messages. By sending root cause messages, the system can decrease the number of messages required to be sent around.

Additive vs. Non-Additive State

Consider that a User A and a User B are playing with a ball. First, User A hits the ball with a force directed in a particular direction. Assume that the force interacts with the mass of the ball, gravity, etc. and causes the ball to move in a particular way. Next, User B hits the ball, which causes the ball to move based also on these assumptions.

Next, consider that both User A and User B hit the ball at the same time. The aggregate thrust vector on the ball may be computed by summing up the component thrust vectors. Now consider a system in which all actions may be perturbed by vectors independently (e.g., User A and User B each hit the ball at slightly different times) and that the vectors are added up in the object. In such situations, it is mostly sufficient to sum the difference vectors in a slightly different order in different machines. The aggregate ending position is generally the same, assuming that all other variables (e.g., the mass of the ball) remain constant. The pertinent result is maintaining the illusion of the ball as a shared object. When summing up the component thrust vectors, the simulation of the ball may be performed mostly independently on separate machines, with approximate convergence in the results. These interactions may be referred to as "shared optimistic" or "additive" actions.

Other types of interactions include "shared non-optimistic" or "non-additive" actions. For example, in quantum mechanics, a system can provide super positions which imply that an object may be somewhere in one position, but it is not truly in that one position until the system checks that the object is in that one position. In embodiments of the present invention, the system uses the concept of a "definitive copy."

Recall that an object may be replicated, and thus that "replicas" of the object exist throughout a network. The definitive copy normally resides on the machine of the user who created the object, but, in the case of a shared space, the definitive copy can also reside on a server. The server copy is just another replica of the object. However, the definitive copy carries special properties, including being a "shared non-optimistic" object. When messages are sent to this type of object, the messages do not affect the local copy at all. Instead, all of the messages are sent to the definitive copy, executed by a simulator on an object engine comprising the definitive copy, and then sent everywhere else (including where they came from). Thus, the definitive copy imposes total message ordering on the system, and all replica states evolve in the same way. One drawback is that the interactions may be slower with this type of non-local object. However, using a definitive copy in this manner can provide true consistency between replicas.

Note that there exists another class of "local" objects, which operate only in the local frame. Despite being replicated during creation and property-setting, such a local object maintains its own state. This may be useful for shared optimistic or additive actions, or in cases where aggregation is not dependent on ordering.

In some edge cases, the state affected by the non-root cause messages can cause the state on a second computer's objects to diverge. One mechanism which may be used to address this divergence is vector clocks, which can both detect when this state divergence occurs and correct it, as in Lamport, L, "Time, clocks, and the ordering of events in a distributed system," ACM 21 (7): 558-565 (1978).

Message Distribution: Shared Optimistic vs. Shared Non-Optimistic

Figure 4A:
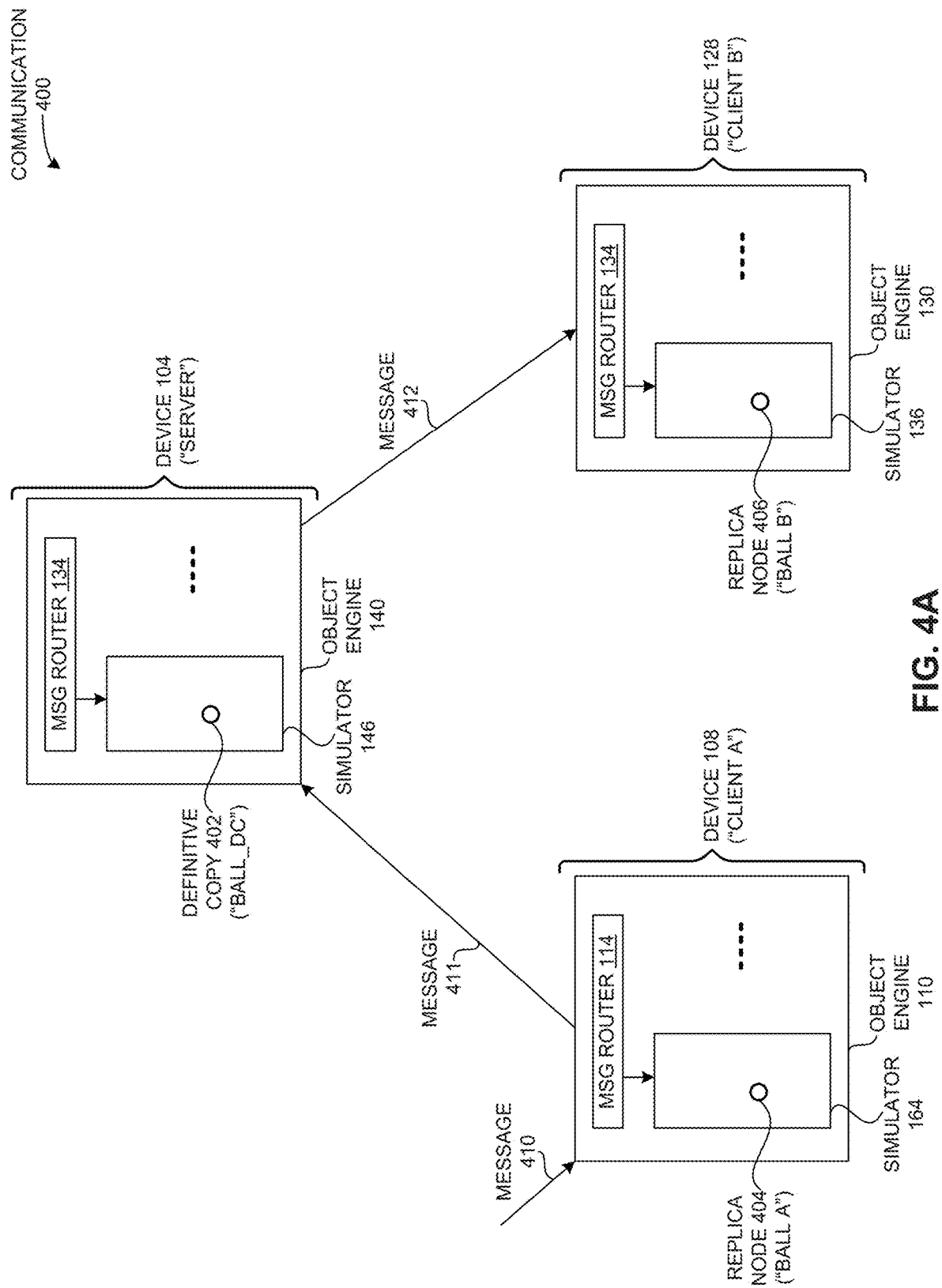
FIG. 4A illustrates an exemplary communication based on a shared optimistic case, in accordance with an embodiment of the present invention.

An exemplary message distribution corresponding to shared optimistic or additive actions is provided below. FIG. 4A illustrates an exemplary communication 400 based on a shared optimistic case, in accordance with an embodiment of the present invention. FIG. 4A is similar to FIG. 1A, with some elements omitted for clarity. Devices 108 and 128 are client devices ("Client A" and "Client B," respectively), while device 104 is a server device ("Server"). Object engines 140, 110, and 130 on each of devices 104, 108, 128, respectively, contain replicas of the same Ball object, where the definitive copy resides on device 104 (or Server). The definitive copy of the Ball object on Server is a definitive copy 240 ("Ball_DC"), the replica of the Ball object on Client A is a replica node 220 ("Ball A"), and the replica of the Ball object on Client B is a replica node 260 ("Ball B"). Assume that all replicas of the Ball object (i.e., Ball A, Ball B, and Ball_DC) have the same position of (0,0,0). Ball A and Ball B are both subscribed to Ball_DC (i.e., Server/Ball_DC has a view object or a view list which includes Client A/Ball A and Client B/Ball B). Furthermore, Ball_DC is subscribed to Ball A and Ball B (i.e., Client A/Ball A has a view object or a view list which includes Server/Ball_DC, and Client B/Ball B has a view object or a view list which includes Server/Ball_DC).

In a simple shared optimistic case, a user associated with Client A can click on a controller to move the Ball object to a position of (1,0,0). Client A can generate and send a root cause message 410 addressed to Ball A (where message 410 has an address which includes an engineID and an instanceID). Message 410 can also include a message fragment indicating, e.g., a Set(position=1,0,0) action. Message 410 is received by Client A's API (not shown) and routed to the appropriate simulator 164 comprising Ball A (as described above in relation to FIG. 1B). The appropriate message queue handles message 410, and the appropriate effector object interprets message 410 and performs the indicated Set action on Ball A. Because Ball A's view list includes Ball_DC, Client A sends message 410 in a new envelope addressed to Server/Ball_DC (as message 411).

Message 411 is received by Server's API (not shown) and routed to the appropriate simulator 146 comprising Ball_DC. The appropriate message queue handles message 411, and the appropriate effector object interprets message 411 and performs the indicated Set action on Ball_DC, so that Ball_DC has a new position of (1,0,0). Because Ball_DC's view list includes Ball B, Server sends message 411 in a new envelope addressed to Client B/Ball B (as message 412). Message 412 is received by Client B's API (not shown) and routed to the appropriate simulator 136. The appropriate message queue handles message 412, and the appropriate effector object interprets message 412 and performs the indicated Set action on Ball B, so that Ball B has a new position of (1,0,0). Ball B can subsequently send message 412 in a new envelope addressed to any subscribing entities on Ball B's view list. Note that although Ball B's view list includes Ball_DC, Ball B does not send a newly addressed copy of message 412 back to Ball_DC because message 412 originated from Ball_DC and the system is operating in shared optimistic mode.

Similarly, although Ball_DC's view list also includes Client A/Ball A, Server does not send a newly addressed copy of message 411 back to Client A/Ball A because message 411 originated from Client A/Ball A, and the system is operating in shared optimistic mode.

Thus, all replicas of the Ball object (i.e., Ball A, Ball B, and Ball_DC) are now at the same position, facilitating a shared virtual reality space.

Figure 4B:
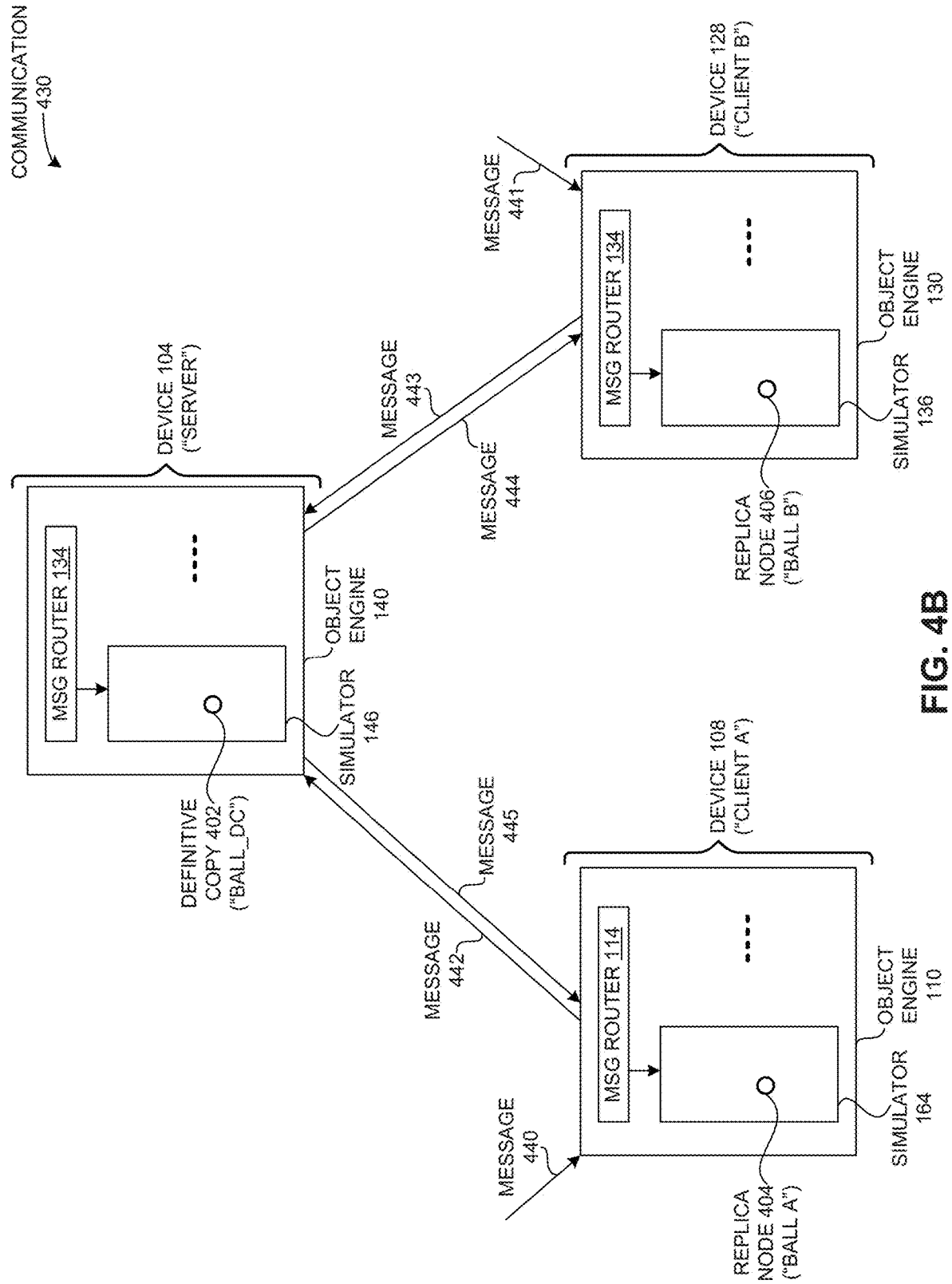
FIG. 4B illustrates an exemplary communication based on a shared optimistic case with additive actions, in accordance with an embodiment of the present invention.

FIG. 4B illustrates an exemplary communication 430 based on a shared optimistic case with additive actions, in accordance with an embodiment of the present invention. In a more complex shared optimistic case, a user associated with Client A can click on a controller to move the Ball object to the right by 1.0 units. Client A can generate and send a root cause message 440 addressed to Ball A. At the same (or similar time), a user associated with Client B can click on a controller to move the Ball object to the left by 1.5 units. Client B can generate and send a root cause message 441 addressed to Ball B. Message 440 executes on Ball A (as described above), so that the position of Ball A is now (1,0,0). Message 441 executes on Ball B, so that the position of Ball B is now (−1.5,0,0). Because Ball A's view list includes Ball_DC, Client A sends message 440 in a new envelope addressed to Server/Ball_DC (as message 442), and because Ball B's view list includes Ball_DC, Client B sends message 441 in a new envelope addressed to Server/Ball_DC (as message 443).

Message 442 and message 443 are both received by Server, and executed in whatever order they arrive. For example, Server can receive and execute message 442, such that the position of Ball_DC is (1,0,0). Server can then receive and execute message 443, such that the position of Ball_DC is (−0.5,0,0). Note that the state of the replicas is momentarily inconsistent.

Because Ball_DC's view list includes Ball B, Server sends message 12 in a new envelope to Client B/Ball B (as message 444). Server does not send a copy of message 442 back to Client A/Ball A because message 442 originated from Client A/Ball A, and the system is operating in shared optimistic mode. Furthermore, because Ball_DC's view list includes Ball A, Server sends message 443 in a new envelope to Client A/Ball A (as message 445). Server does not send a copy of message 443 back to Client B/Ball B because message 443 originated from Client B/Ball B, and the system is operating in shared optimistic mode.

Note that position changes are additive. Client A/Ball A receives and executes message 445, such that the position of Ball is (−0.5,0,0). Client B/Ball B receives and executes message 444, such that the position of Ball B is (−0.5,0,0). Finally, all replicas of the Ball object (i.e., Ball A, Ball B, and Ball_DC) are now at the same position, facilitating a shared virtual reality space.

Figure 4C:
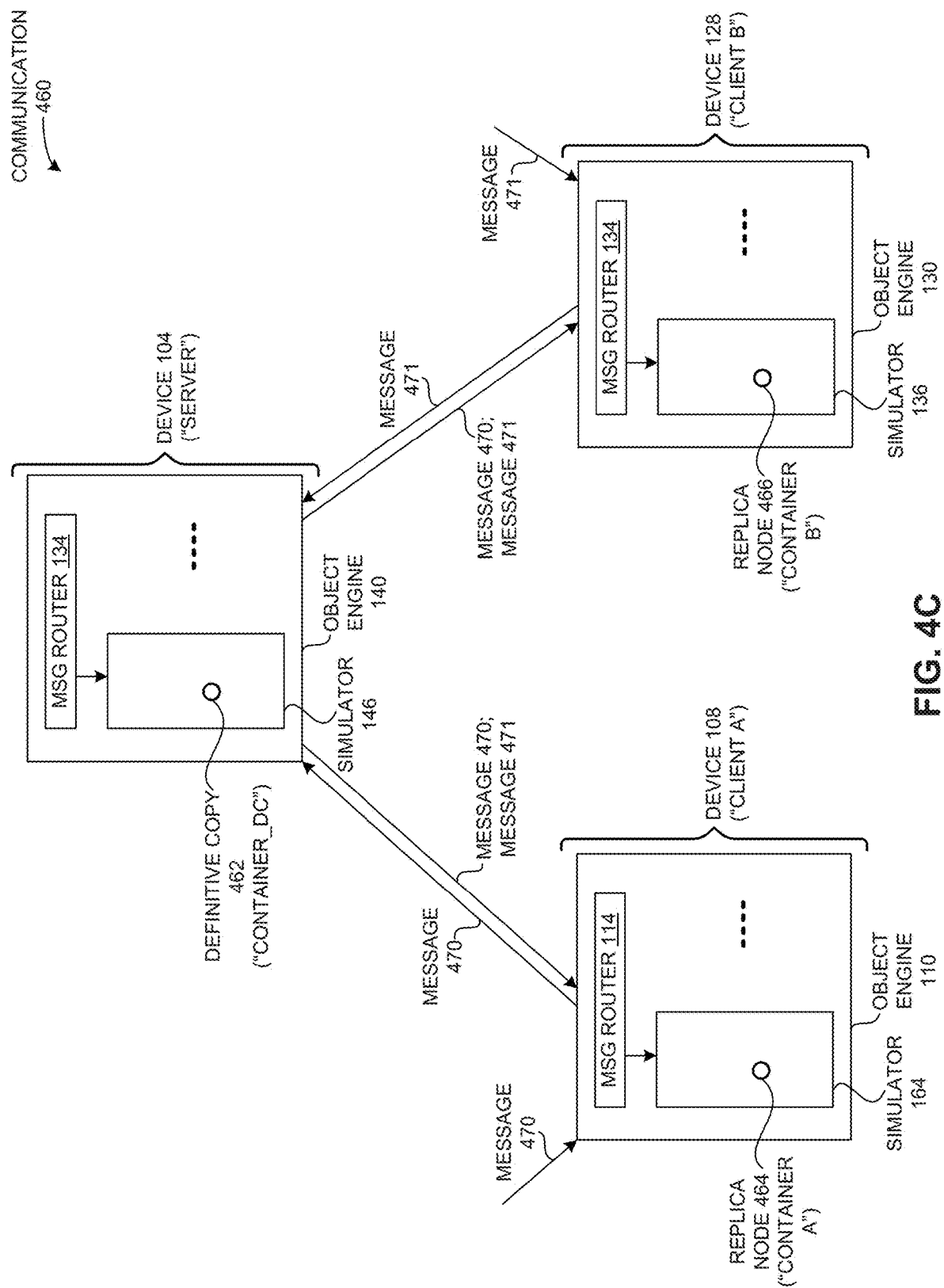
FIG. 4C illustrates an exemplary communication based on a shared non-optimistic case with non-additive actions, in accordance with an embodiment of the present invention.

FIG. 4C illustrates an exemplary communication 460 based on a shared non-optimistic case with non-additive actions, in accordance with an embodiment of the present invention. In the shared non-optimistic case, where actions are non-additive and ordering is essential, the definitive copy preserves the order in the following manner. Server has a definitive copy 462 of a Container object which includes colored balls in a specific order, initially ordered as (Red, Green,Blue), referred to as "Container_DC." The replica of the Container object on Client A is a replica node 464 ("Container A"), and the replica of the Container object on Client B is a replica node 466 ("Container B"). Assume that the view lists are similar as to the example provided above in FIG. 4A. Container A and Container B both include colored balls in the same specific order as Container_DC (i.e., (Red,Green,Blue)). For the sake of clarity, in communication 460, a message that is re-addressed in a new envelope to another entity retains its original message number, in contrast to the re-named messages depicted in communications 400 and 430 of FIGS. 4A and 4B, respectively.

A user associated with Client A can use a controller to add a blue ball to the Container object. Client A can generate and send a root cause message 470 to its local Container A to add a blue ball to Container A (such as addBall(Blue)). At the same (or similar) time, a user associated with Client B can use a controller to add a red ball to the Container object. Client B can generate and send a root cause message 471 to add a Red ball to Container B (such as addBall(Red)). Both replicas know that they are not the definitive copy, so they do not execute message 470 and message 471 on their respective replicas. Instead, Client A/Container A and Client B/Container B send message 470 and message 471, respectively, in new envelopes to the definitive copy (i.e., Server/Container_DC). Server/Container_DC receives message 470 and message 471, and executes them in the order received. Assume that message 470 is received first by Server. Message 470 executes on Container_DC (as described above), so that Server now has a Container ordered as (Red,Green,Blue,Blue). Server/Container_DC then sends message 470 in a new envelope to all of its views (e.g., to all of the subscribed entities on Container_DC's view list), including where the message originated from.

Message 471 is received second by Server. Message 471 executes on Container_DC, so that Server now has a Container ordered as (Red,Green,Blue,Blue,Red). Server/Container_DC then sends message 471 in a new envelope to all of its views, including where the message originated from.

Re-addressed message 470 and re-addressed message 471 are received in that order by each of Client A/Container A and Client B/Container B, and thus executed in that order, resulting in both Container A and Container B ordered as (Red,Green,Blue,Blue,Red). In this manner, the system can achieve eventual consistency with imposed message ordering.

In the case where the definitive copy resides on a client instead of the server, the routing behavior may be modified, including the state in the message. For example, the client (with the definitive copy) needs to know to send the message back up to the server, and the server handles re-distribution, but not back to the client from which the message originated. This behavior may be implemented using a state machine.

Method for Facilitating a Shared Virtual Reality Space

Figure 5A:
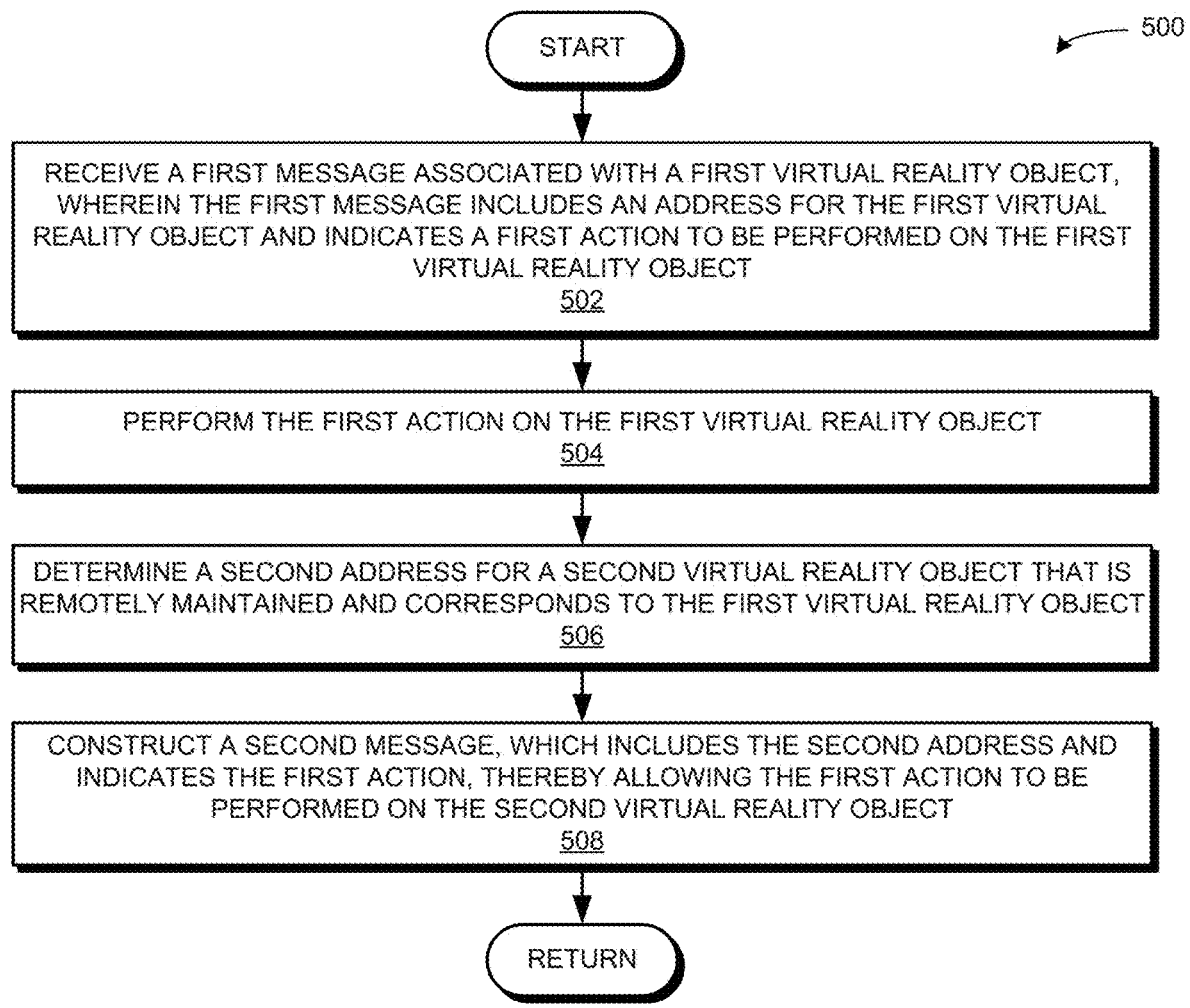
FIG. 5A presents a flow chart illustrating a method for facilitating shared virtual reality space, in accordance with an embodiment of the present invention.

FIG. 5A presents a flow chart 500 illustrating a method for facilitating shared virtual reality space, in accordance with an embodiment of the present invention. During operation, the system receives a first message associated with a first virtual reality object, wherein the first message includes a first address for the first virtual reality object and indicates a first action to be performed on the first virtual reality object (operation 502). The system performs the first action on the first virtual reality object (operation 504). The system determines a second address for a second virtual reality object that is remotely maintained and corresponds to the first virtual reality object (operation 506). The system constructs a second message, which includes the second address and indicates the first action, thereby allowing the first action to be performed on the second virtual reality object (operation 508).

Figure 5B:
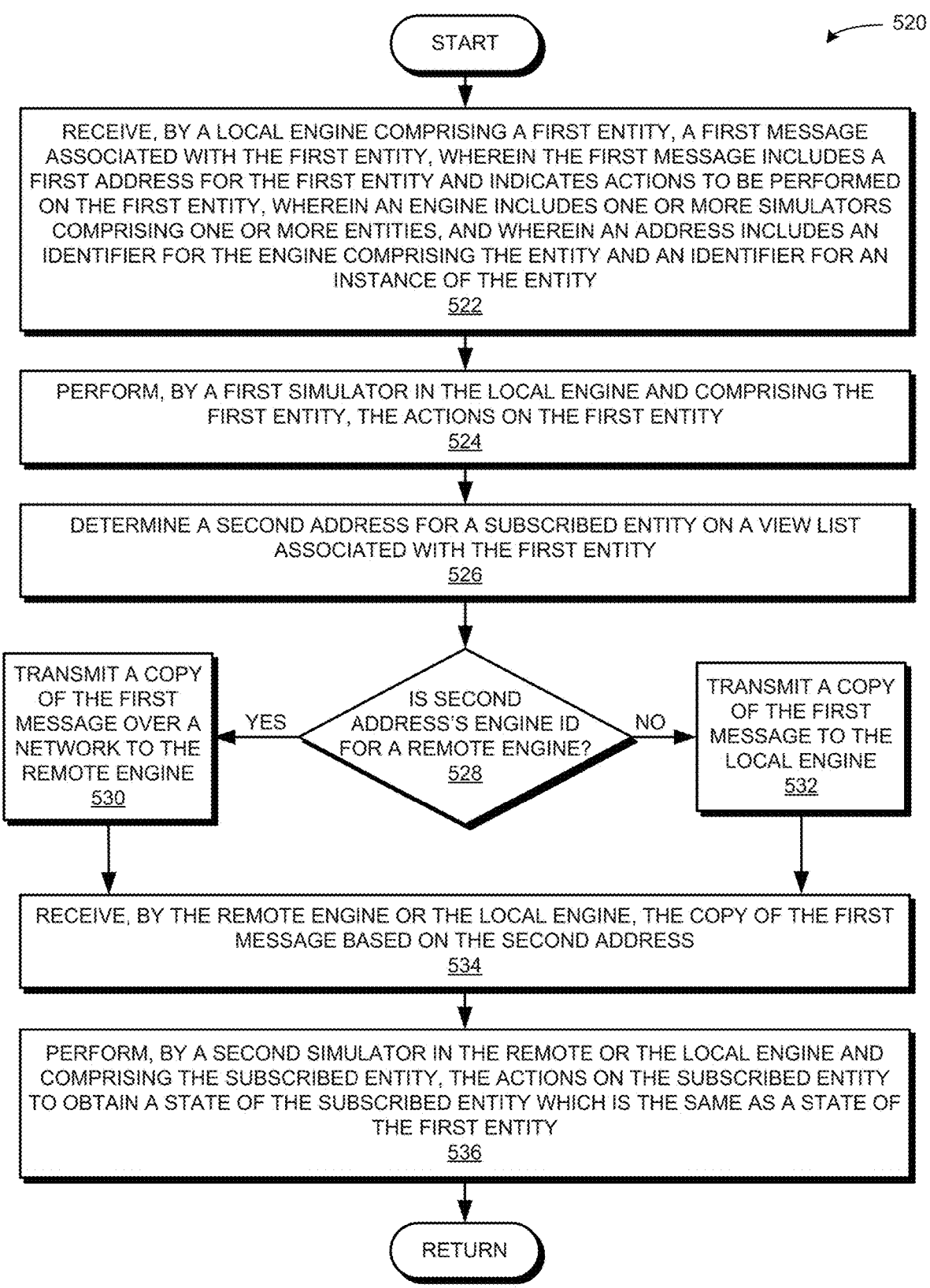
FIG. 5B presents a flow chart illustrating a method for facilitating shared virtual reality space, in accordance with an embodiment of the present invention.

FIG. 5B presents a flow chart 520 illustrating a method for facilitating shared virtual reality space, in accordance with an embodiment of the present invention. During operation, the system receives, by a local engine comprising a first entity, a first message associated with the first entity, wherein the first message includes a first address for the first entity and indicates actions to be performed on the first entity (operation 522). An engine includes one or more simulators comprising one or more entities, and an address includes an identifier for the engine comprising the entity ("engineID") and an identifier for an instance of the entity ("instanceID"). The system performs, by a first simulator in the local engine and comprising the first entity, the actions on the first entity (operation 524). The system determines a second address for a subscribed entity on a view list associated with the first entity (operation 526). The system can also determine a plurality of subscribed entities on the view list. The view list can be a view object or any other data structure that indicates one or more entities subscribed to a view of received messages associated with the first entity.

If the second address's engineID is for a remote engine (decision 528), the system transmits a copy of the first message over a network to the remote engine (operation 530), based on the engineID. If the second address's engineID is for the local engine (decision 530), the system transmits the message to the local engine (operation 532). The system receives, by the remote engine or the local engine, the copy of the first message based on the second address (operation 534). The system performs, by a second simulator in the remote or the local engine and comprising the subscribed entity, the actions on the subscribed entity to obtain a state of the subscribed entity which is the same as a state of the first entity (operation 536). Thus, the system facilitates a shared virtual reality space.

Figure 5C:
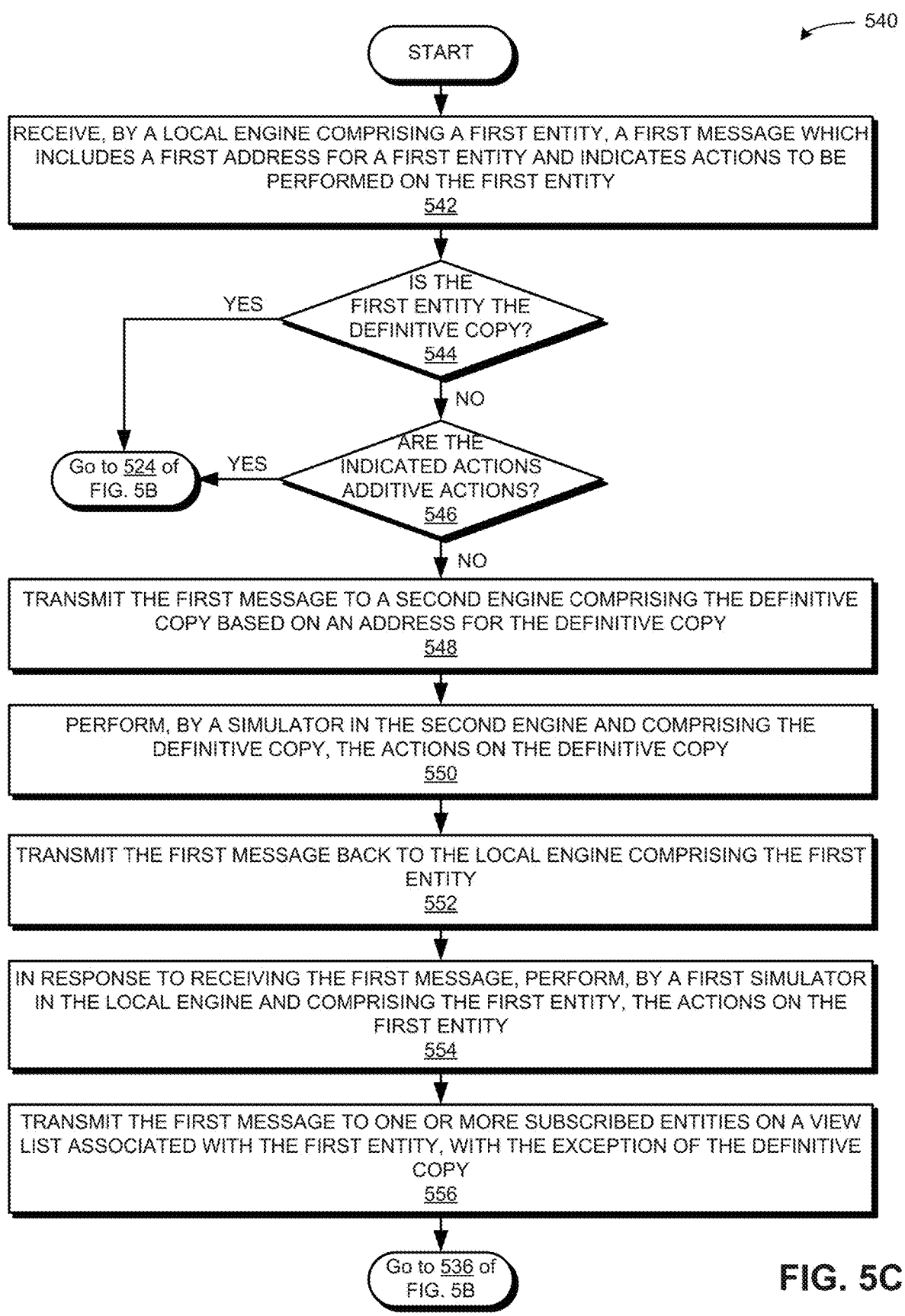
FIG. 5C presents a flow chart illustrating a method for facilitating shared virtual reality space, including processing additive and non-additive actions, in accordance with an embodiment of the present invention.

FIG. 5C presents a flow chart 540 illustrating a method for facilitating shared virtual reality space, including processing additive and non-additive actions, in accordance with an embodiment of the present invention. During operation, the system receives, by a local engine comprising a first entity, a first message which includes a first address for the first entity and indicates actions to be performed on the first entity (operation 542). If the first entity is the definitive copy (decision 544), the operation continues as described at operation 524 of FIG. 5B. If the first entity is not the definitive copy (decision 544), the system determines if the indicated actions are additive actions (decision 546). If they are, the operation continues as described at operation 524 of FIG. 5B. If the actions are not additive actions, the system transmits the first message to a second engine comprising the definitive copy based on an address for the definitive copy (operation 548).

The system performs, by a simulator in the second engine and comprising the definitive copy, the actions on the definitive copy (operation 550). The system transmits the first message back to the local engine comprising the first entity (operation 552). In response to receiving the first message, the system performs, by a simulator in the local engine and comprising the first entity, the actions on the first entity (operation 554). The system transmits the first message to one or more subscribed entities on a view list associated with the first entity, with the exception of the definitive copy (operation 556). That is, the system does not transmit the message back to the definitive copy, even though the definitive copy is a subscribed entity on the view list. The operation continues as described at operation 536 of FIG. 5B.

Figure 5D:
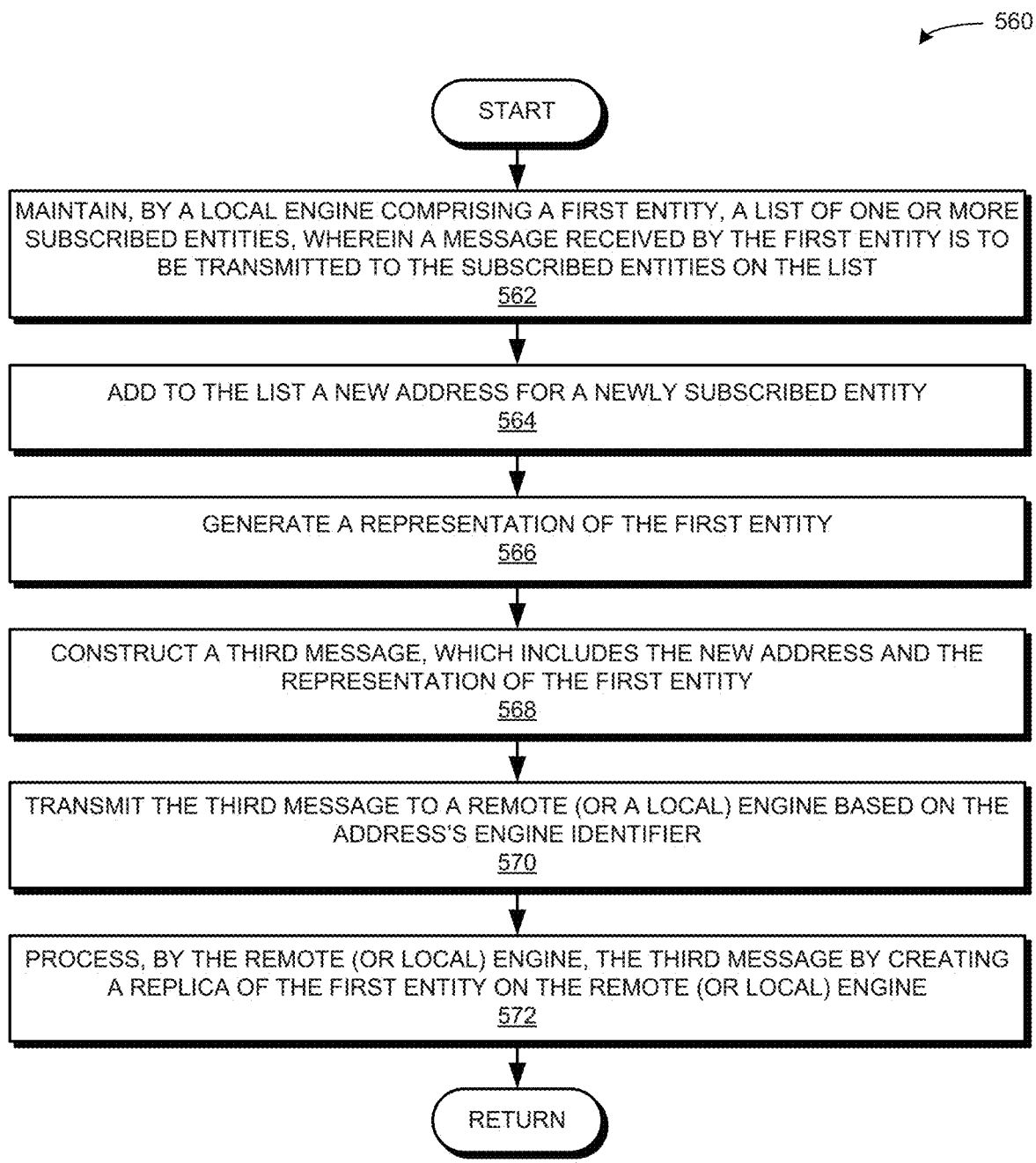
FIG. 5D presents a flow chart illustrating a method for establishing a replica in a shared virtual reality space, in accordance with an embodiment of the present invention.

FIG. 5D presents a flow chart 560 illustrating a method for establishing a replica in a shared virtual reality space, in accordance with an embodiment of the present invention. During operation, the system maintains, by a local engine comprising a first entity, a list of one or more subscribed entities, wherein a message received by the first entity is to be transmitted to the subscribed entities on the list (operation 562). Recall that an entity can be a virtual reality object, a node, or an edge. The system adds to the list a new address for a newly subscribed entity (operation 564). The list can be a view or a view list or a view object which indicates the list of subscribed entities. The system can add the newly subscribed entity (and the new address for the newly subscribed entity) to the list in response to a request received by the local engine or during an initialization or configuration process.

The system generates a representation of the first entity (operation 566). The representation of the first entity can indicate information needed to transmit and replicate the state of the first entity across a network, e.g., via serialization and creating an object for transmission across a network, as described below. The system constructs a third message, which includes the new address and the representation of the first entity (operation 568). The system transmits the third message to a remote (or a local) engine based on the address's engine identifier (operation 570). The system processes, by the remote (or local) engine, the third message by creating a replica of the first entity on the remote (or local) engine (operation 572).

Serialization and Distributed Snapshots

Serialization and object transmission are essential to the operation of the system. There are two ways of serializing objects, i.e., of generating a representation of a virtual reality object:

1) The object itself can replicate itself into a message. The message may be formed by a Create message fragment, specifying the nodeClass, instanceID, parentID, and other fields of the object, followed by a series of Set message fragments to replicate the properties of the object. This method may be used when transferring a single object from one object engine to another.

2) The object can be completely described by a serialized version of the state. The state is the set of persistent instance variables, plus the node class and other variables. This state can be serialized in a number of ways, such as to JSON or to BSON (as used in several NoSQL databases). JSON is typically used in systems which communicate with JavaScript (e.g., web tools operating on the REST API exposed by the system for the connection of such objects).

The system can transparently support serialization of individual single actor nodes. Serialization can be called from a message. The normal state return mechanism can be used to return state to the caller.

An object may be transferred singly to another machine ("replication") by generating a message (as in serialization method (1)) to the parent of the object being serialized, with the contents of the message creating the object as a child of the parent, and then setting the properties onto it. The "replicateTo" input on many objects can support this type of transparent object migration. Similarly, objects can send their state to other objects by generating a state-setting method with a set of Set fragments. This mechanism may be used in an instance-based inheritance mechanism.

All objects in the system, including the low-level primitive objects, and other components of actor objects (such as vectors of 3 floats), and the higher level objects (e.g., nodes), have an associated "serializer object." A serializer object can save the object to the formats mentioned above. This type of low-level serialization is used to "squash" objects into a format suitable for transmission or persistence storage. Every instance variable type used in the system has a serializer object.

In most single threaded systems, persistence of a complex hierarchical object (like a Zone or Container object) can be performed by a depth or breath first tree walk of the object structure. In embodiments of the present invention, different objects in the spanning hierarchy may be running in different simulator threads, so such a walk may violate the principles of thread confinement described above. To address this issue, the system can use a distributed snapshot algorithm to perform the serialization of a complex object, based on the following steps:

a) The hierarchical index for the object concerned is consulted, and a tree is generated with slots for each of the objects contained in a depth-first traversal of the spanning hierarchy for the object.

b) An instance of a distributed snapshot node is generated, containing the tree from step (a). This instance object can receive state snapshots from each of the individual objects.

c) A "serialize" message is broadcast to each of the objects in the spanning hierarchy, with the replyTo field of the message set to send the reply back to the distributed snapshot node.

d) As the objects process the messages, they generate a single level serialization of themselves and send this to the distributed snapshot node.

e) The distributed snapshot receives the individual snapshots and assembles them into a complete serialized tree.

f) Once the tree is complete, the distributed snapshot is passed back to the caller of the snapshot method.

This method has the advantage that it performs serialization essentially in parallel on nodes, which allows large scenes to be quickly serialized. Note that state can be slightly inconsistent between snapshots when nodes are receiving a large message volume, and this may be prevented by using thread barriers.

Exemplary Rendering Engine

Embodiments of the present invention can work with an underlying rendering engine which is largely agnostic to the object engine and architecture of the present invention. Separating the rendering engine loop from the general message processing can result in the processing of a large number of simulation message without a resultant slowdown in the rendering engine. For example, large numbers of messages in the order of 100,000 messages per second can be generated without any effect on the rendering.

Such a rendering engine can be termed a "Rendering Engine Abstraction Layer," or REAL. A mini or a full object engine may exist inside of a REAL system. Objects in REAL may be written in C++ and can mirror Java objects with a thread-safe object modification API which allows state transfer between the two systems.

The implementation of REAL objects can expose object methods to modification methods encapsulated by the same type of message fragment used in the main object engine implementation. A set of mirror objects on the main object engine side of the implementation can create these method-call objects in "transactions" by calling methods on native mirror objects. A transaction can correspond generally to the execution of a method. When the transaction is closed, the completed message is placed in a message processing queue inside the rendering engine. The contents of the queue are processed in-between render frames by the native code running the render loop. This incurs a relatively small computational cost because queue-processing can occur while the GPU is rendering the current frame and after all state has been committed to the card.

The same loop also reads UI device positions, such as the HMD trackers, joysticks, and mouse. A set of methods can allow the lower-level code to inject messages into the higher-level object engine. The injected messages can be processed in the object engine, or go off-core to other engines. Many of these injected messages are root cause messages.

Another system can perform "message collapsing," because the C++ code can produce messages faster than a single Java simulation thread can consume. In this other system, the C++ code injects a sane amount of message into Java when, e.g., dragging an object around, instead of overwhelming the Java simulator threads.

Figure 6:
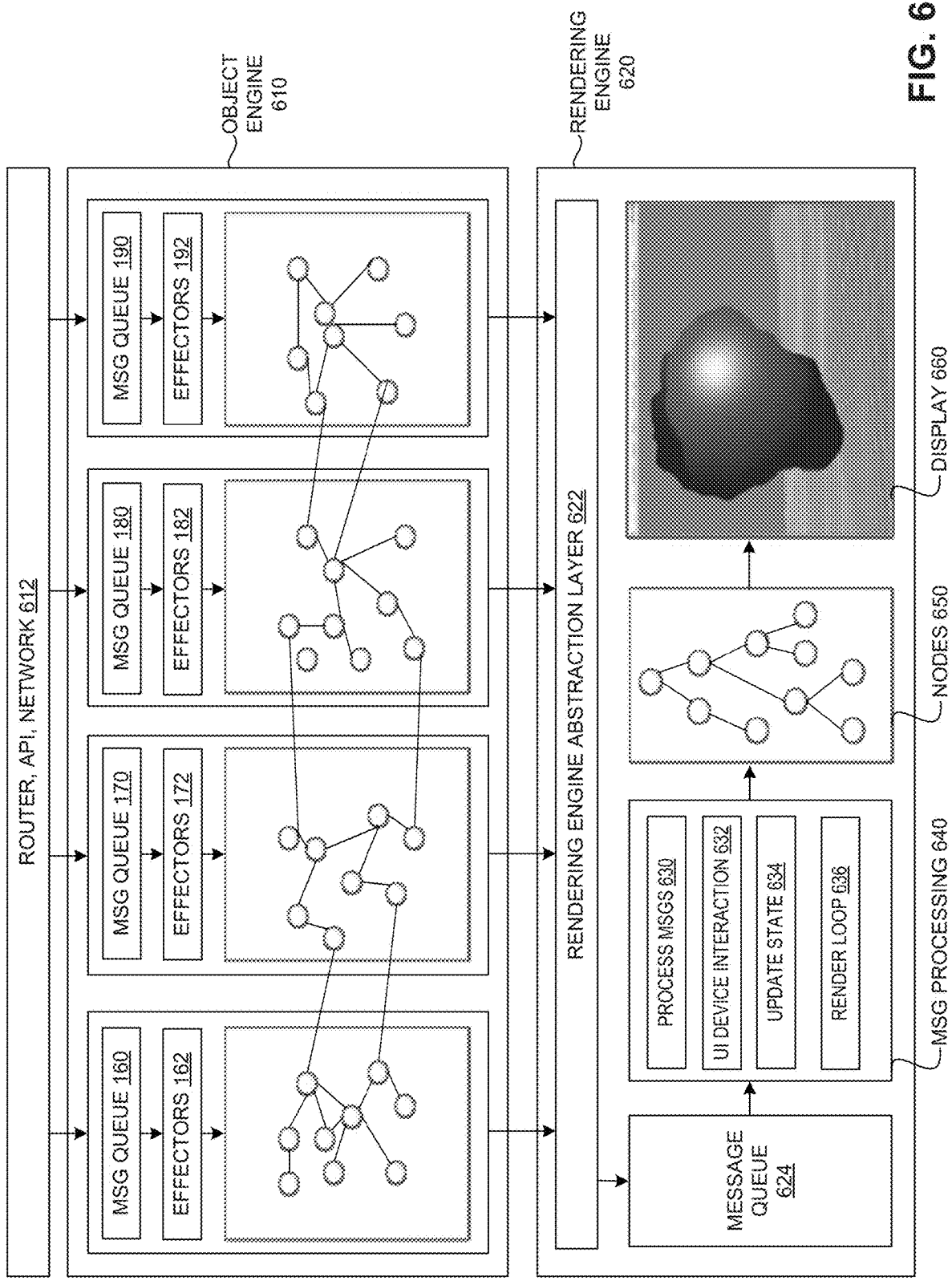
FIG. 6 illustrates an object engine with a separate rendering engine, which facilitates shared virtual reality space, in accordance with an embodiment of the present invention.

REAL can use Modern OpenGL, including Vertex Array Objects (VAOs). FIG. 6 illustrates an object engine 610 with a separate rendering engine 620, which facilitates shared virtual reality space, in accordance with an embodiment of the present invention. Object engine 610 can receive messages via a network, API, and router (shown for purposes of FIG. 6 as a single module 612). Object engine 610 can also include simulators, each with a message queue, effectors, and thread-confined nodes, as described above in relation to FIG. 1A. Object engine 610 can interact with rendering engine 620 by sending a state of an object or node in object engine 610 to rendering engine abstraction layer (REAL) 622. The REAL module can send the message to a message queue 624, which in turns sends the message to message processing block 640. Message processing block 640 can include a process messages function 630, a UI device interaction function 632, an update state function 634, and a render loop function 636. Message processing block 640 can perform the functions on nodes 650, resulting in the rendering of the state of nodes 650 as shown in display 660.

Multi-Machine Operation

A single client can attach to content from multiple sources. In other words, a shared virtual reality space can comprise: a first set of thread-confined nodes running on a simulator on Server A; a second set of thread-confined nodes running on a simulator on Server B; and a third set of thread-confined nodes running on a simulator on Server C. Servers A, B, and C can control different objects in the shared space. For example, given a space which covers objects that are underwater in the sea or floating on top of the water, on the land, and in the air, Server A can control objects that are under or on top of the water, such as a fish or a floating boat. Server B can control the behavior of objects on the land, such as palm trees waving in the wind. Server C can control the behavior of objects in the air, such as a flying flock of birds. Users viewing this exemplary shared space can interact with content from any of Servers A, B, and C that are in their current view. Such users can also interact with content from only one of Servers A, B, and C. For example, in the case of tilting a user's view upwards to the sky, the user may only see objects running on Server C, which controls the behavior of objects in the air. The routing system may be modified to enable this operation of shared spaces using multiple viewed spaces.

The Low-Level Model and the Meaning of "Edge"

The model for shared space has been described above, including how nodes and edges can be replicated between machines, and how edges partially define the topology of message flow in the system. In embodiments of the present invention, "edges" can have multiple meanings, which are defined by the implementation of the objects that the edges connect between. The default meaning of an "edge" is to pass messages between the objects, as previously described.

One alternative meaning of an "edge" is a low-level function call binding, which is primarily used in the procedural generation of geometry. Some system use function pointers to "wire together" component objects into an execution tree such that evaluating a method on one object causes a nested chain of function calls, as in the NoiseLib approach of Bevins, J. "libnoise—A portable, open-source, coherent noise-generating library for C++," http://libnoise.sourceforge.net (last visited Jan. 18, 2017). In the NoiseLib scheme, each module computes a function of the module outputs to which it is connected, where leaf objects are procedural noise generation functions or constants. A complex noise function can thus be generated by connecting objects together. The present system allows the instantiation of higher-level objects, which can connect together such lower-level objects, based on an implementation similar to NoiseLib. Like network mirroring, the higher-level objects can have lower-level mirrors inside REAL which connect together with edges that express function calls. REAL objects can be thought of as a view (through a different lens) of the same underlying object structure.

Another alternative meaning of an "edge" is a compilation-to-compute-shader noise functions. A network of noise functions can be compiled into a set of interlocked noise functions in a computer shader (e.g., OpenCL or CUDA). The OpenCL compiler can be distributed along with modern OpenGL drivers by graphics card vendors and does not require a separate shader compiler install, and so may be preferred because it allows for the compilation of the source generated from the noise function network on the client side. Once the shader is compiled and loaded into the card, the shader can execute over a range of values, with the same-or-similar function calls as in the low-level function call binding, and executed in parallel. The output can be, e.g., a height-map, bitmap, or mesh geometry warp. Having such code running in parallel on the graphics card can be much faster than evaluating the low level function call binding for a large set of points. This can allow for rapid procedural generation of terrain, objects deformed by noise, etc.

Yet another alternative meaning of an "edge" is a compilation to graphics shaders. This is similar to the compilation-to-compute-shader noise functions, but shading languages (e.g., GLSL and HLS) are compiled in order to produce an appearance effect at the graphics rendering layer. More complex shaders may be constructed out of an assembly of lower level "shader components." ShaderForge, http://forum.unity3d.com/threads/shader-forge-a-visual-node-based-shader-editor.191595 (last visited Jan. 18, 2017), is a single, specialist tool model that shows an example of how this may work, although recall that the system of the present invention is just one layer in the same paradigm (nodes and edges) all the way down.

One other alternative meaning of an "edge" is as meta-edges. Meta-edges are edges which generate other lower-level edges and potentially nodes, conceptually "contained" in the edge. Recall that edges are actors which can send and receive messages in their own right. Thus, an edge can be made to create a number of other lower-level objects upon insertion. For example, given a video controller widget with outputs for "play" and "stop," and inputs that grey out the play button if a video is not loaded, there may be a video player widget with a corresponding set of inputs and outputs. Rather than hand-wiring all of these edges together, a "meta edge" object can be created, which, when inserted between two "high-level" ports, can create all of the sub-edges, by using a stored message which performs symbolic creation of the objects needed to wire the two objects together. These "low-level" connections can be hidden inside the higher-level object.

Security Against Remote Code Execution and the Object Model

All of the above-described approaches "wire together" pre-defined objects and functions. These approaches confer a degree of security on the application, and at the same time also allow access to advanced functionality without allowing the downloading and execution of untrusted code. Remote code execution (RCE) bugs have been discovered in systems which allowed downloaded code, and most of the graphics stack may be susceptible to such problems.

Downloaded textual code may be allowed in the system, perhaps for node behaviors, but the execution environment in which this code runs needs to be tightly controlled. This is something which cannot be done with, e.g., downloaded shader code, which must execute on the GPU. Thus, these issues provide a major motivation for the overall "wire together" trusted components approach exemplified by the architecture described herein.

Security at the User Level

Many situations exist in which a user may not wish to give another user unfettered open access to their objects. As one example, griefers and spammers are known to exploit such open access. In order to secure objects, a multi-layer permissions system can be implemented.

User identity across a connection can be initially verified with long-lived public/private key pairs. Clients can generate and store a unique key pair on a user-by user basis. A centralized server can maintain the public keys. The private key does not leave the user's machine. A number of public keys can be associated with a given user account. In general, there is one key per machine on which the user is running the system. Servers will also have a unique key.

Any initial connections to an object engine can be verified with a centralized user login service which will issue a "lease" for a user. The login server can reject users who are known bad actors. The local object engine can request a public key for any user in order to perform this verification, while the centralized service can provide information on user validity. The local implementing object engine may augment or relax access restrictions based on this information.

Once a lease is issued, the channel can be secured using a symmetric key passed either under the public-private key pair encryption, or using a Diffie-Hellman key exchange. Messages signed using this key are valid for a particular period of time. The key can be periodically refreshed using a standard key ratchet mechanism, e.g., a system with forward and future secrecy properties such as in Whisper Systems, "Advanced cryptographic ratcheting," https://whispersystems.org/blog/advanced-ratcheting (last visited Jan. 18, 2017).

If the identity of the user at the other end of the connection is validated, permissions to access objects may be granted using the following permission system. Overall "default" permissions on an object-by-object basis can be available using the standard unix like "rwx"—read-write-execute flags on a user, group, and world basis. These flags control whether other users can read the object, write to it (change state), or execute ports on the object. Flags can be stored in an "accessFlags" property on the object, which is a map of symbolically identified flags. Many situations exist in which specific ports may need to be writeable, e.g., a "draggable" object. In such a situation, the setPosition and moveBy ports can be writable, while nothing else about the object can be changed. To accommodate this, permissions may be overridden on a port-by-port and property-by-property basis. Each port or property can have its own version of the flags, with common versions available in the editing tools.

The identity of the user can flow along with the messaging chain and can be available as part of the message execution context. Furthermore, server-to-server connections can also be secured using the key pair. In the case where servers directly communicate with each other, servers can have the public keys of the servers allowed access.

Moreover, individual server operators may require the ability to kick a troublesome user out of their space. A user reputation scheme can be implemented, including additional server access gates which can be based on this scheme. A kicking scheme can establish that a user cannot access a given server for a period of time (possibly forever). A banning scheme can provide a more serious restriction and can be based on multiple infractions. The ban can potentially ban an individual IP address, user name, or email address from interaction with the system. Shadow banning, in which the user can see things occurring in the world, but cannot affect it, can be another option for dealing with such users.

The Object Store and Entering a Space

Whenever a large composite object (e.g., a Zone) is running, the graph for the zone is resident in the memory of a server or servers. Any user connecting to the server running the space can receive a serialized version of the state of the objects in a large transmission obtained using a distributed snapshot, or piecemeal via the view system as described above. Once views for the user are added to the objects close to the user's position, the user can receive any messages sent to those objects that are root cause messages, thus creating the illusion of shared space.

When the user is operating in single user mode, the user's object engine can load directly from the object store without attaching to an intermediate server. This state can be separate on a per-user basis, and can operate similarly to loading a web page. Any multi-user functionality may be coded as part of the application, rather than appearing transparently as a result of the underlying object model.

In either case, this running in-memory version of the scene needs to get loaded from somewhere. Likewise, instances of "reusable" objects need to get their base state loaded. An asset store can provide this functionality. A partial list of objects to be stored in the asset store can include:

Simple serialized instances of objects, such as nodes and edges

Composite serialized instances of objects, consisting of a network of connected objects Shaders (in some cases GLSL (or similar) code, and in other cases shader networks)

Procedural noise networks, which when instantiated, are capable of generating geometry Lua and/or Javascript scripts (attached to nodes or otherwise)

Texture bitmaps

Procedural texture generation networks

Geometry files (such as .obj or other files)

Height maps

Complex geometry hierarchies, such as those provided for in Collada or GLTF

SPIR or similar intermediate bytecode representations of graphics programs

Audio samples (such as .ogg format)

Stereo video "Cutscenes" and other related material

Other miscellaneous media representation formats

Media stored in the object store can be referenced via a simple path, e.g., "/User/miker/tests/testZone4." The object store can also answer simple indexing queries semantically equivalent to "ls/Users/miker/test" and can respond in JSON.

An object engine can locate a space (Zone) to load in three different ways. The first way is via a configuration file, which is read in at server startup time. The configuration file can specify a number of spaces to pre-load, along with "mount points" in the hierarchical index space (e.g., /World/Zones/zone3) to mount the content. The user with a client can then open a network connection to the server, download a Zone list, and go to the remote Zone, which connects to the remote server and installs a user presence object in the Zone. That user will contain a view, which will get added to nearby objects.

The second way is allowing the user to specify an http URL to go to, where the system loads the Zone directly from that URL. The URL can be arbitrary, but the responding server can implement the object store API and return a well-formed piece of content. This does not generate a live Zone connection in that objects do not receive updates unless explicitly scripted.

The third way is allowing a user to click on a link from a web-page. The content of the link can be a small JSON ".CLO" file, which contains a reference to a live server or an http URL to load from. An association on the user's machine can invoke the system on the downloaded file, passing the file to the application as an argument. A configuration file or a specified URL can be read from the file, and the connection made to the space.

Implementation of the Object Store

A cloud storage such as Amazon S3 may be used for the object store implementation. A front-end web server capable of expressing a REST API, such as Jetty, can allow users to put and get objects from a set of buckets implemented in S3.

User identity can be verified by the encryption of a secret string generated from a username, the UTC date/time, and a random salt. Upon verification, the user can upload and download objects to the user's personal "directory," and also read from other directories, given appropriate permissions. The object store can use Amazon's edge caching system to distribute content close to users. Running instances of the object store can use Amazon's high availability facilities to act in concert, storing state in the same set of buckets.

Figure 7:
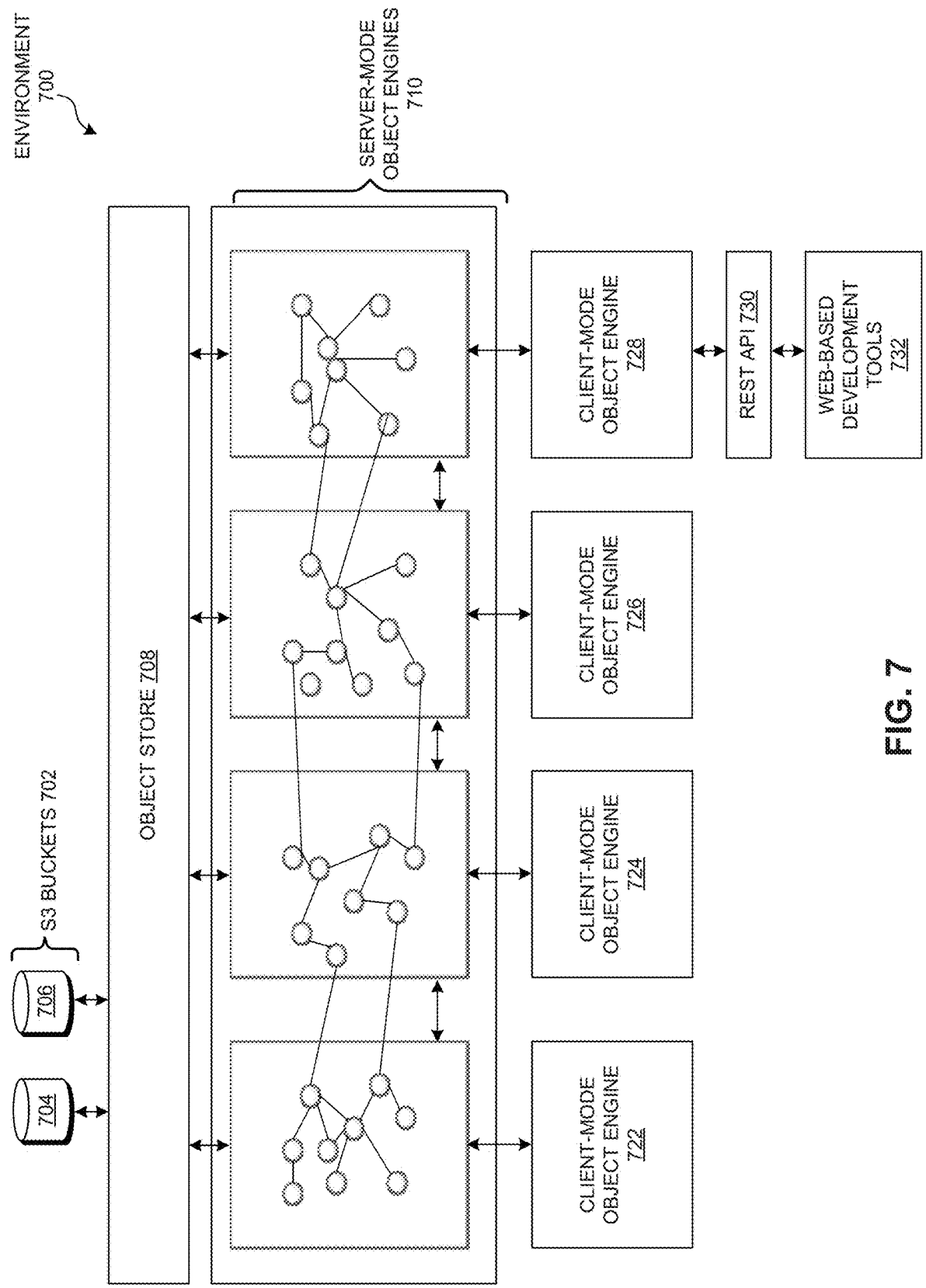
FIG. 7 illustrates an exemplary environment which includes an object store and front-end tools for facilitating shared virtual reality space, in accordance with an embodiment of the present invention.

FIG. 7 illustrates an exemplary environment 700 which includes an object store and front-end tools for facilitating shared virtual reality space, in accordance with an embodiment of the present invention. Environment 700 can include storage servers 704 and 706 (e.g., Amazon S3 buckets 702). Servers 704 and 706 can interact with an object store 708, which in turn interacts with server-mode object engines 710. For purposes of illustration, four sets of thread-confined nodes are depicted, where each set can correspond to a respective server-mode object engine. Server-mode object engines 710 can be connected to client-mode object engines 722, 724, 726, and 728. A client-mode object engine can run on a specific OS, such as Windows or Android. For example, client-mode object engine 728 can have a Windows-based OS and can interact with web-based development tools 732 via a REST API 730. Front-end editing tools such as tools 732 can operate on instances of a user's object instance, and any message-based modifications can flow up to server-mode object engines 710 on the back-end.

Message Routing

In order for a message to update the state of an object on a remote Object Engine instance, the message must be routed to the appropriate engine. This may be trivial when the message is addressed to the local object engine from which it originated. To support more complex routing, an object engine can have a basic routing system. An "overlay network" can be used which does not rely upon conventional IP routing, except for point-to-point connections between object engines. This can prevent the exposure of the IP address of one user's client object engine to another user. Also, users frequently have their client located behind one or more NAT boxes, which refuse incoming connections without an outgoing socket connection.

Routes between engines are established when one object engine connects to another. Two types of routes include those across native TCP sockets, and those across HTTP (where the HTTP routes can be used only for the connection of web tools). Clients can have a local route for messages inside the local object engine, and a default route to the server to which the client is connected. Servers can have a local route, and a number of client routes (one per connected client). Thus, servers may send messages to all of their clients, and clients may send messages to other clients via the server, but with an obscured IP address.

Note that the system obviates the need for the infrastructure mode servers (e.g., server-mode object engines 710) to actually do any simulation at all, as the entire working of the system can be pushed out to the clients, with the servers merely routing messages. Also note that other potential routing schemes exist, including peer-to-peer schemes.

The Scripting System; External Tools API; and In-Environment Editing

Users may wish to extend the system using conventional scripting languages like Lua, or JavaScript, for example implemented using Google's V8 engine. The chosen scripting language may require extensive sandbox protection in order to avoid RCE problems. Scripts may need to undergo validation before being available in the object store.

One possibility for implementing scripts is that any object can have a script attached to it. The script property of the object can contain the script. When the script is modified, the script is recompiled on the various systems in parallel, and any ports added for the methods contained in the script. Another possibility is that the scripts are confined to a special "script" object.

The external tools API can be an HTTP REST API, which can be used to connect external tools to the system. One type of external tool is a node-based editor, in which the user can connect objects together. This can include a simple property editor. Another type of external tool is a simple command line interface. Both these external tools can use the same REST APIs and perform only two interactions with the system: 1) read the serialized state of the nodes using the aforementioned distributed snapshot code; and 2) write the state into the system by sending messages into it using the message system, which is exposed as a REST API accepting JSON serialized representations of messages.

Note that when individual clients are connected to the same shared space, because the edit messages are all root-cause messages, the messages can enable multi-person editing. Also note that the system can also include mechanisms for performing in-environment editing. For example, environment 700 of FIG. 7 depicts the connection of front-end web development tools 732 (e.g., JavaScript) to local client-mode object engine 728 to enable content editing.

Exemplary Computer System

Figure 8:
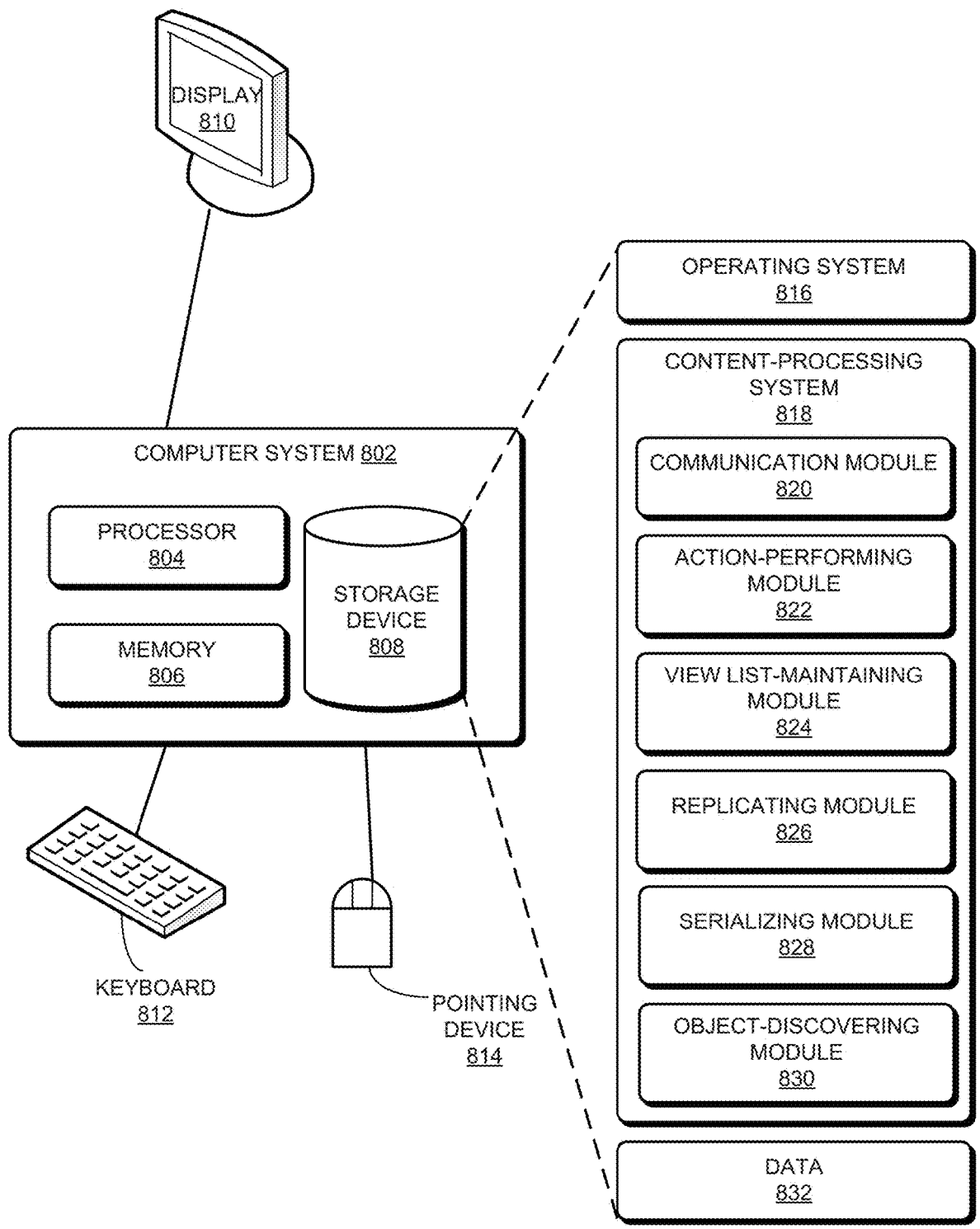
FIG. 8 illustrates an exemplary computer system that facilitates shared virtual reality space, in accordance with an embodiment of the present invention.

FIG. 8 illustrates an exemplary computer system 802 that facilitates an efficient transport protocol, in accordance with an embodiment of the present invention. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 830.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network or within a network node itself (communication module 820). Further, content-processing system 818 can include instructions for receiving a first message associated with a first virtual reality object, wherein the first message includes a first address for the first virtual reality object and indicates a first action to be performed on the first virtual reality object (communication module 820). Content-processing system 818 can include instructions for performing the first action on the first virtual reality object (action-performing module 822). Content-processing system 818 can also include instructions for determining a second address for a second virtual reality object that is remotely maintained and corresponds to the first virtual reality object (view list-maintaining module 824). Content-processing system 818 can include instructions for constructing a second message, which includes the second address and indicates the first action, thereby allowing the first action to be performed on the second virtual reality object (replicating module 826).

Furthermore, content-processing system 818 can include instructions for adding to a list associated with the first virtual reality object, including adding to the list a new address for a new virtual reality object (view list-maintaining module 824). Content-processing system 818 can include instructions for generating a representation of the first virtual reality object (serializing module 828). Content-processing system 818 can include instructions for constructing a third message, which includes the new address and the representation of first virtual reality object, thereby allowing a replica of the first virtual object to be created remotely based on the new address (replicating module 826).

Content-processing system 818 can additionally include instructions for discovering one or more virtual reality objects in a network based on one or more of an instance index, a hierarchical index, and a spatial index (object-discovering module 830). Content-processing system 818 can include instructions for determining whether a virtual reality object is a definitive copy of a replica, and for determining whether an action comprises an additive action (replicating module 826).

Data 832 can include any data that is required as input or that is generated as output by the methods and/or processes described in this disclosure. Specifically, data 832 can store at least: a message; a message associated with a virtual reality object; an action; an address; a message which includes an address and indicates an action; an engine identifier; an instance identifier; a UUID; a GUID; an address comprised of an engine identifier and an instance identifier; a list; a view list; a view object; a data structure that indicates a list of subscribed entities; an object; a virtual reality object; an actor; an entity; a node; an edge; a port; a child node; a parent node; a property or state of an object; a replica message; an execution context; a plurality of message fragments; a message fragment which corresponds to an effector object which performs an action; an effector; an effector object; an address for a virtual reality object that is remotely maintained and corresponds to a virtual reality object that is locally maintained; a replica of an object; a definitive copy of an object; a representation of a virtual reality object; an additive action; a non-additive action; an indication of a definitive copy or an additive or a non-additive action; an engine; an engine including one or more simulators; a simulator comprising one or more objects; an index; an instance index; a hierarchical index; a spatial index; an object engine; a message router or a routing table; a message queue; an API or other network interface; a reply-to field; an error-to field; a routing flag; and a rendering engine.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating shared virtual reality space, the method comprising:
receiving, by a running program which is one of a plurality of running programs maintaining the shared virtual reality space, a first message associated with a first virtual reality object of a plurality of virtual reality objects which comprise edges and nodes,
wherein an edge is an object with a sender port and a receiver port,
wherein the first message includes a first address for the first virtual reality object and indicates a first action to be performed on the first virtual reality object,
wherein the first address for the first virtual reality object includes:
a first identifier for an engine associated with a simulator in which the first virtual reality object is contained; and
a second identifier for an instance of the first virtual reality object associated with the engine,
wherein the first virtual reality object is a node with one or more node ports,
wherein the node is uniquely identified by a combination of the first identifier and the second identifier,
wherein a respective node port can be dynamically coupled via one or more edges to ports on other nodes, which causes messages generated by the node to be communicated to another node to which the node is coupled via the respective node port and one of the one or more edges, and
wherein the one or more edges which couple to the respective node port of the node which comprises the first virtual reality object can be connected and disconnected dynamically by the running program;

performing the first action on the first virtual reality object;

observing, by a first entity which has previously subscribed to view state changes to be made to the first virtual reality object, a state of the first virtual reality object;

maintaining, for the first virtual reality object, a list that includes addresses for the first entity and other currently subscribed entities which have previously requested to view state changes to be made to the first virtual reality object;

determining, based on the list of the addresses of the subscribed entities, a second address for a second virtual reality object that is remotely maintained and corresponds to the first virtual reality object;

constructing a second message, which includes the second address and indicates the first action, thereby allowing the first action to be performed on the second virtual reality object; and responsive to adding to the list for the first virtual reality object a new address for a new virtual reality object and generating a representation of the first virtual reality object, constructing a third message, which includes the new address and the representation of the first virtual reality object, which causes a replica of the first virtual reality object to be created remotely based on the new address, wherein each message, including the first message, the second message the third message, and any message generated by a node to be communicated to another node to which the node is coupled by an edge, is routed to a message queue at a respective simulator where the message is executed, and wherein each message is a byte code program or equivalent which, in an execution context of a respective node by the respective simulator, effects changes to the state of the respective node, including properties and connections made to other nodes.

2. The method of claim 1, further comprising:
discovering one or more other virtual reality objects in a network based on one or more of:
an instance index which is based on an instance identifier for a respective virtual reality object;
a hierarchical index which is based on a path name for a respective virtual reality object; and
a spatial index which is based on a queried distance in three-dimensional space away from a specified virtual reality object.

3. The method of claim 1, wherein the first virtual reality object is one or more of:
an actor;
an entity; and
an object.

4. The method of claim 3, wherein the first action indicated in the first message includes one or more of:
creating a child node of an identified parent node;
removing the first virtual reality object;
setting a property of the first virtual reality object;
returning a property of the first virtual reality object;
invoking a specified input or output port;
connecting an output edge on an identified port to another node;
connecting a set of output edges on a set of identified ports to another set of ports;
setting a context by pointing an execution context to another node; and
committing the first action.

5. The method of claim 1, wherein the first message includes a plurality of fragments, wherein a respective fragment corresponds to an effector object which performs the first action.

6. The method of claim 1, wherein the first virtual reality object is a replica of the second virtual reality object residing in a remote engine;
wherein only one definitive copy of a replica exists for a respective virtual reality object; and
wherein the method further comprises:
in response to determining that the first virtual reality object is not the definitive copy and that the first action does not comprise an additive action:
determining the second address in advance of performing the first action, wherein the second address corresponds to the definitive copy;
constructing the second message, thereby allowing the first action to be performed on the definitive copy, and allowing a third message to be constructed, wherein the third message includes the first address and indicates the first action; and
in response to receiving the third message, performing the first action on the first virtual reality object; and
in response to determining that the first virtual reality object is the definitive copy, performing the first action on the first virtual reality object.

7. A computer system for facilitating shared virtual reality space, the system comprising:
a processor; and
a storage device storing instructions that when executed by the processor cause the processor to perform a method, the method comprising:
receiving, by a running program which is one of a plurality of running programs maintaining the shared virtual reality space, a first message associated with a first virtual reality object of a plurality of virtual reality objects which comprise edges and nodes,
wherein an edge is an object with a sender port and a receiver port,
wherein the first message includes a first address for the first virtual reality object and indicates a first action to be performed on the first virtual reality object,
wherein the first address for the first virtual reality object includes:
a first identifier for an engine associated with a simulator in which the first virtual reality object is contained; and
a second identifier for an instance of the first virtual reality object associated with the engine,
wherein the first virtual reality object is a node with one or more node ports,
wherein the node is uniquely identified by a combination of the first identifier and the second identifier,
wherein a respective node port can be dynamically coupled via one or more edges to ports on other nodes, which causes messages generated by the node to be communicated to another node to which the node is coupled via the respective node port and one of the one or more edges, and wherein the one or more edges which couple to the respective node port of the node which comprises the first virtual reality object can be connected and disconnected dynamically by the running program;

performing the first action on the first virtual reality object;

observing, by a first entity which has previously subscribed to view state changes to be made to the first virtual reality object, a state of the first virtual reality object;

maintaining, for the first virtual reality object, a list that includes addresses for the first entity and other currently subscribed entities which have previously requested to view state changes to be made to the first virtual reality object;

determining, based on the list of the addresses of the subscribed entities, a second address for a second virtual reality object that is remotely maintained and corresponds to the first virtual reality object;

constructing a second message, which includes the second address and indicates the first action, thereby allowing the first action to be performed on the second virtual reality object; and responsive to adding to the list for the first virtual reality object a new address for a new virtual reality object and generating a representation of the first virtual reality object, constructing a third message, which includes the new address and the representation of the first virtual reality object, which causes a replica of the first virtual reality object to be created remotely based on the new address, wherein each message, including the first message, the second message, the third message, and any message generated by a node to be communicated to another node to which the node is coupled by an edge, is routed to a message queue at a respective simulator where the message is executed, and wherein each message is a byte code program or equivalent which, in an execution context of a respective node by the respective simulator, effects changes to the state of the respective node, including properties and connections made to other nodes.

8. The computer system of claim 7, wherein the method further comprises:
discovering one or more other virtual reality objects in a network, based on one or more of:
an instance index which is based on an instance identifier for a respective virtual reality object;
a hierarchical index which is based on a path name for a respective virtual reality object; and
a spatial index which is based on a queried distance in three-dimensional space away from a specified virtual reality object.

9. The computer system of claim 7, wherein the first virtual reality object is one or more of:
an actor;
an entity; and
an object.

10. The computer system of claim 9, wherein the first action indicated in the first message includes one or more of:
creating a child node of an identified parent node;
removing the first virtual reality object;
setting a property of the first virtual reality object;
returning a property of the first virtual reality object;
invoking a specified input or output port;
connecting an output edge on an identified port to another node;
connecting a set of output edges on a set of identified ports to another set of ports;
setting a context by pointing an execution context to another node; and
committing the first action.

11. The computer system of claim 7, wherein the first message includes a plurality of fragments, wherein a respective fragment corresponds to an effector object which performs the first action.

12. The computer system of claim 7, wherein the first virtual reality object is a replica of the second virtual reality object residing in a remote engine;
wherein only one definitive copy of a replica exists for a respective virtual reality object; and
wherein the method further comprises:
in response to determining that the first virtual reality object is not the definitive copy and that the first action does not comprise an additive action:
determining the second address in advance of performing the first action, wherein the second address corresponds to the definitive copy;
constructing the second message, thereby allowing the first action to be performed on the definitive copy, and allowing a third message to be constructed, wherein the third message includes the first address and indicates the first action; and
in response to receiving the third message, performing the first action on the first virtual reality object; and
in response to determining that the first virtual reality object is the definitive copy, performing the first action on the first virtual reality object.

13. A non-transitory computer-readable storage medium storing instructions that when executed by a computer cause the computer to perform a method, the method comprising:
receiving, by a running program which is one of a plurality of running programs maintaining a shared virtual reality space, a first message associated with a first virtual reality object of a plurality of virtual reality objects which comprise edges and nodes,
wherein an edge is an object with a sender port and a receiver port,
wherein the first message includes a first address for the first virtual reality object and indicates a first action to be performed on the first virtual reality object,
wherein the first address for the first virtual reality object includes:
a first identifier for an engine associated with a simulator in which the first virtual reality object is contained; and
a second identifier for an instance of the first virtual reality object associated with the engine,
wherein the first virtual reality object is a node with one or more node ports,
wherein the node is uniquely identified by a combination of the first identifier and the second identifier,
wherein a respective node port can be dynamically coupled via one or more edges to ports on other nodes, which causes messages generated by the node to be communicated to another node to which the node is coupled via the respective node port and one of the one or more edges, and
wherein the one or more edges which couple to the respective node port of the node which comprises the first virtual reality object can be connected and disconnected dynamically by the running program;
performing the first action on the first virtual reality object;

observing, by a first entity which has previously subscribed to view state changes to be made to the first virtual reality object, a state of the first virtual reality object;

maintaining, for the first virtual reality object, a list that includes addresses for the first entity and other currently subscribed entities which have previously requested to view state changes to be made to the first virtual reality object;

determining, based on the list of the addresses of the subscribed entities, a second address for a second virtual reality object that is remotely maintained and corresponds to the first virtual reality object;

constructing a second message, which includes the second address and indicates the first action, thereby allowing the first action to be performed on the second virtual reality object; and responsive to adding to the list for the first virtual reality object a new address for a new virtual reality object and generating a representation of the first virtual reality object, constructing a third message, which includes the new address and the representation of the first virtual reality object, which causes a replica of the first virtual reality object to be created remotely based on the new address, wherein each message, including the first message, the second message the third message, and any message generated by a node to be communicated to another node to which the node is coupled by an edge, is routed to a message queue at a respective simulator where the message is executed; and wherein each message is a byte code program or equivalent which, in an execution context of a respective node by the respective simulator, effects changes to the state of the respective node, including properties and connections made to other nodes.

14. The storage medium of claim 13, wherein the method further comprises:

discovering one or more other virtual reality objects in a network based on one or more of:

an instance index which is based on an instance identifier for a respective virtual reality object;

a hierarchical index which is based on a path name for a respective virtual reality object; and a spatial index which is based on a queried distance in three-dimensional space away from a specified virtual reality object.

15. The storage medium of claim 13, wherein the first virtual reality object is a replica of the second virtual reality object residing in a remote engine;

wherein only one definitive copy of a replica exists for a respective virtual reality object; and wherein the method further comprises:

in response to determining that the first virtual reality object is not the definitive copy and that the first action does not comprise an additive action:

determining the second address in advance of performing the first action, wherein the second address corresponds to the definitive copy;

constructing the second message, thereby allowing the first action to be performed on the definitive copy, and allowing a third message to be constructed, wherein the third message includes the first address and indicates the first action; and in response to receiving the third message, performing the first action on the first virtual reality object; and in response to determining that the first virtual reality object is the definitive copy, performing the first action on the first virtual reality object.

* * * * *